(12) United States Patent
Yan et al.

(10) Patent No.: US 10,906,385 B2
(45) Date of Patent: Feb. 2, 2021

(54) HYBRID VEHICLE POWERTRAINS WITH FLYWHEEL ENERGY STORAGE SYSTEMS

(71) Applicant: THE REGENTS OF THE UNIVERSITY OF CALIFORNIA, Oakland, CA (US)

(72) Inventors: Jifei Yan, Wuhan (CN); Andrew Frank, Davis, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 36 days.

(21) Appl. No.: 16/227,082

(22) Filed: Dec. 20, 2018

(65) Prior Publication Data

US 2019/0184805 A1   Jun. 20, 2019

Related U.S. Application Data

(63) Continuation of application No. PCT/US2017/039127, filed on Jun. 23, 2017.
(Continued)

(51) Int. Cl.
| | |
|---|---|
| *B60K 6/10* | (2006.01) |
| *B60K 6/543* | (2007.10) |
| *B60K 6/26* | (2007.10) |
| *B60K 6/30* | (2007.10) |
| *B60K 6/24* | (2007.10) |

(Continued)

(52) U.S. Cl.
CPC ............ *B60K 6/105* (2013.01); *B60K 6/24* (2013.01); *B60K 6/26* (2013.01); *B60K 6/30* (2013.01); *B60K 6/543* (2013.01); *B60K 17/22* (2013.01); *B60W 10/04* (2013.01);
(Continued)

(58) Field of Classification Search
None
See application file for complete search history.

(56) References Cited

U.S. PATENT DOCUMENTS

| | | | | |
|---|---|---|---|---|
| 4,588,040 A | * | 5/1986 | Albright, Jr. | ........... B60L 50/30 180/165 |
| 4,625,823 A | * | 12/1986 | Frank | ..................... B60K 6/105 180/165 |

(Continued)

FOREIGN PATENT DOCUMENTS

| | | |
|---|---|---|
| JP | 2011156957 A | 8/2011 |
| JP | 2015034584 A | 2/2015 |

(Continued)

OTHER PUBLICATIONS

ISA/KR, Korean Intellectual Property Office (KIPO), International Search Report and Written Opinion dated Sep. 28, 2017, related PCT international application No. PCT/US2017/039127, pp. 1-15, claims searched, pp. 16-19.

*Primary Examiner* — Dirk Wright
(74) *Attorney, Agent, or Firm* — Park, Vaughan, Fleming & Dowler LLP

(57) ABSTRACT

A hybrid vehicle powertrain with a flywheel-based short-term energy storage system (SESS), including control and design optimization for a hybrid electric vehicle with the flywheel as a third energy storage system. The powertrain comprises three different propulsion systems including: an internal combustion engine (ICE); an electric motor (EM) with battery; and a flywheel and continuously variable transmission (CVT) that comprise the SESS.

54 Claims, 13 Drawing Sheets

Related U.S. Application Data

(60) Provisional application No. 62/354,604, filed on Jun. 24, 2016.

(51) Int. Cl.
    *B60K 17/22*           (2006.01)
    *B60W 20/15*           (2016.01)
    *B60W 10/04*           (2006.01)
    *B60W 10/101*          (2012.01)
    *B60W 10/24*           (2006.01)
    *H02K 7/02*            (2006.01)

(52) U.S. Cl.
    CPC .......... *B60W 10/101* (2013.01); *B60W 10/24* (2013.01); *B60W 20/15* (2016.01); *H02K 7/025* (2013.01)

(56) References Cited

U.S. PATENT DOCUMENTS

| | | | | |
|---|---|---|---|---|
| 7,410,436 B2 * | 8/2008 | Van Druten | ........... | B60K 6/105 475/5 |
| 7,967,714 B2 * | 6/2011 | Van Druten | ........... | B60K 6/105 475/211 |
| 8,359,145 B2 * | 1/2013 | Bowman | ................ | B60K 6/105 701/53 |
| 8,375,811 B2 * | 2/2013 | Kees | ....................... | B60K 6/105 73/865 |
| 8,398,515 B2 * | 3/2013 | Sartre | .................... | B60K 6/105 475/6 |
| 8,702,545 B2 * | 4/2014 | Tanaka | ................... | B60K 6/105 475/5 |
| 8,702,547 B2 * | 4/2014 | Van Druten | ........... | B60L 50/60 475/111 |
| 8,708,081 B1 * | 4/2014 | Williams | ............... | B60K 6/105 180/165 |
| 8,840,499 B2 * | 9/2014 | Buffet | .................... | B60K 6/105 475/151 |
| 9,028,362 B2 * | 5/2015 | He | ......................... | B60K 6/105 477/3 |
| 9,102,223 B2 * | 8/2015 | Greenwood | ........... | B60K 6/105 |
| 9,333,847 B1 * | 5/2016 | Buffet | ................... | B60W 20/30 |
| 9,623,743 B2 * | 4/2017 | Wesolowski | ........... | B60W 10/24 |
| 9,770,968 B2 * | 9/2017 | van Druten | ........... | B60K 6/105 |
| 9,789,756 B2 * | 10/2017 | Schwartz | ................ | B60L 50/61 |
| 2010/0192708 A1 | 8/2010 | Kees | | |
| 2012/0028752 A1 * | 2/2012 | Van Druten | .... | B60W 30/18027 475/269 |
| 2012/0197472 A1 * | 8/2012 | He | ........................... | B60K 6/52 701/22 |
| 2013/0226419 A1 | 8/2013 | Jensen | | |

FOREIGN PATENT DOCUMENTS

| | | |
|---|---|---|
| WO | 2008125860 A1 | 10/2008 |
| WO | 2017223524 A1 | 12/2017 |

* cited by examiner

HYBRID VEHICLE POWERTRAINS WITH FLYWHEEL ENERGY STORAGE SYSTEMS

CROSS-REFERENCE TO RELATED APPLICATIONS

This application claims priority to, and is a 35 U.S.C. § 111(a) continuation of, PCT international application number PCT/US2017/039127 filed on Jun. 23, 2017, incorporated herein by reference in its entirety, which claims priority to, and the benefit of, U.S. provisional patent application Ser. No. 62/354,604 filed on Jun. 24, 2016, incorporated herein by reference in its entirety. Priority is claimed to each of the foregoing applications.

The above-referenced PCT international application was published as PCT International Publication No. WO 2017/223524 A1 on Dec. 28, 2017, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a hybrid vehicle drivetrain, and more particularly to a hybrid vehicle powertrain with a flywheel energy storage system.

2. Background Discussion

In the last few decades, increasing fuel costs and tightening emission regulations have caused many researchers in the field of automotive engineering to develop alternative energy technologies to replace the conventional Internal Combustion Engine (ICE). A variety of technologies have been implemented. The technologies include fuel cell, battery, super-capacitor, flywheel and other different kinds of energy storage technology. While some researchers focus on pure alternative energy vehicle powertrains such as pure electric powertrains, many researchers put their efforts in developing hybrid powertrains that incorporate the conventional ICE and alternative energy devices. Although some people considered the dual energy source hybrid powertrain a temporary or transitional solution, the hybrid vehicle is commercialized successfully for its fuel consumption reduction capability, relatively reasonable price and maturity in the technology. Due to technological advancements that significantly enhanced the onboard computational power of the ground vehicle, sophisticated control algorithms for the dual energy hybrid powertrain have been developed for both commercial implementation and academic study. These control algorithms have often been referred to as energy management strategies since the majority of these control algorithms achieve fuel consumption reduction from managing energy flow among the primary and secondary energy sources.

The existing research on hybrid powertrain focuses on dual energy source hybrid powertrains.

BRIEF SUMMARY

An aspect of the present disclosure is a hybrid vehicle powertrain with a flywheel energy storage system, including control and design optimization for a hybrid electric vehicle with a flywheel as a third energy storage system.

In one embodiment, a hybrid vehicle powertrain configuration according to the present disclosure comprises three different propulsion systems including: an internal combustion engine (ICE); an electric motor (EM) and battery; and a flywheel and continuously variable transmission (CVT).

In one embodiment, a short-term energy storage system (SESS) according to the present disclosure comprises a flywheel and CVT attached to the main drive shaft of a power-split hybrid electric powertrain to replace a second electric motor of the hybrid electric powertrain. Energy is stored in the SESS and drawn from it to propel the vehicle.

In one embodiment of the powertrain, the output shaft of the ICE is connected to the input shaft of EM by a clutch; the output shaft of EM is connected to the driveshaft; and the SESS is connected to the driveshaft by a gear box or gear set.

It will be appreciated that the described powertrain with a flywheel CVT SESS has more freedom in splitting power among the three on-board energy sources than any other existing hybrid powertrain. Additionally, the flywheel SESS is a low cost, low weight, compact and high power subsystem that can replace expensive and heavy electric components of a hybrid electric powertrain.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
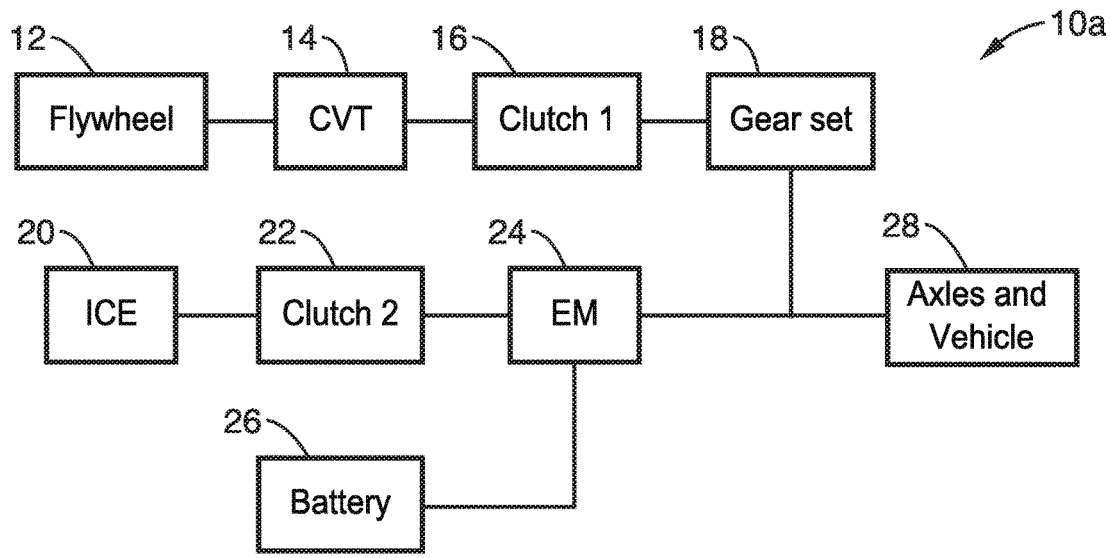
FIG. 1 shows a schematic view of a first configuration of a Tri-Energy Source Hybrid (TESH) powertrain in accordance with the present description.

Hybrid Electric Vehicles (HEV) equipped with an Internal Combustion Engine (ICE) and Electric Machine (EM) have been proven to be very effective at increasing fuel economy and reducing pollution and greenhouse gasses. In the present description, a third energy source, and in particular an energy buffer, is introduced into the HEV powertrain to serve as an energy buffer to level the peak load of the powertrain. The energy buffer, also referred to as a Short-term Energy Storage System (SESS), is designed to allow two main power sources, the ICE, and EM, to operate in their optimal states by assisting at peak propulsion/in braking scenarios. Improvement of the powertrain can also be achieved by downsizing the ICE and EM while the decreased power supply is compensated by the SESS. Several different options for SESS may be implemented: e.g. battery, fuel cells, supercapacitors, hydraulic accumulators, and flywheels.

The main goal of introducing a third energy storage system into a HEV powertrain is to level the peak load of the primary and secondary energy system so that they can operate at better efficiencies. To achieve this goal, the third energy storage system, or SESS, needs to have certain characteristics such as: the capability to charge and discharge, high power density, long lifetime, moderate energy density and high efficiency.

Compared to electrochemical batteries, both the life cycle and very high specific power, 500-2500 W/kg of the supercapacitor satisfy the above criteria as SESS. However, the specific energy of a supercapacitor is relatively low (5 Wh/kg), and efficiency at deep charge/discharge is also relatively low. Although the peak load can be distributed among the primary, secondary and SESS, neither the primary fuel converter nor the secondary fuel converter are working at their optimal state since the secondary energy storage system and the SESS often share the secondary fuel converter.

Besides an electrochemical energy storage system, mechanical energy storage systems, such as flywheels, have also been very commonly used in automotive applications since the beginning of the automotive industry. Typically, flywheels are coupled to the end of the crankshaft to deliver a smooth power flow. The flywheel serving as the energy storage unit in Hybrid-Inertia powertrains is desired to have the same characteristics as the electrical energy storage, e.g. high robustness, high reliability, low initial cost and replacement costs, long calendar and cycle life, high specific energy, and high specific power. Despite the fact that the flywheel system has a higher specific power than that of battery system, flywheel systems' specific energy is generally lower than the battery systems. For a small unit flywheel, its specific energy can reach 30 Wh/kg, including housing, electronic controllers, etc. Flywheel systems with advanced material have been predicted to reach a specific energy of 140 Wh/kg.

Another type of mechanical SESS is the Hydraulic Accumulator (HA) SESS. In the Hydraulic Accumulator SESS, energy is stored in the compressed gas contained by the Hydraulic Accumulator vessel. An HA can be connected to the mechanical drive shaft via pump/motor so that the energy flow can be converted between the forms of hydraulic and kinetic. HA systems have high power density and long life cycles, and these are very desirable factors for a SESS. However, an HA system also has problems such as low efficiency and low specific energy.

Flywheel systems have characteristics such as high specific power, low cost, long life time and moderate specific energy. One other important characteristic of a flywheel system is that the loss in the flywheel system is independent of the power flow. In other words, unlike a supercapacitor or battery, the efficiency of the flywheel will not increase when the power input/output of the system increases. Although HA and supercapacitor are both feasible solutions for SESS, the flywheel is specifically chosen in the embodiments described below, since frequent, high power charge and discharge of the flywheel system will not cause significant loss while flywheel system also has characteristics such as high power density, long lifetime and moderate energy density.

1. Tri-Energy Source Hybrid (TESH) Configurations

FIG. 1 shows a schematic view of a first configuration of a Tri-Energy Source Hybrid (TESH) powertrain 10a. Powertrain 10a comprises a first branch including a flywheel 12, continuously variable transmission (CVT) 14, first clutch (clutch 1) 16 and gear set 18. The flywheel/CVT branch is coupled to the powertrain at the output end of Electric Motor (EM) 24, which powered by battery 26 and is coupled to Internal Combustion Engine (ICE) 20 through second clutch 22. The ICE-EM branch is the primary energy source for powering the axles and vehicle 28, and has no transmission. The Flywheel-CVT branch of powertrain 10a is primarily used a peak leveling device. The Flywheel-CVT branch is stand-alone from the ICE 20 or EM 24, so there is only one pathway, i.e. CVT 14, for the flywheel 12 to charge/discharge energy.

Variations of powertrain 10a may be made by moving the coupling point to different locations of the powertrain while the characteristics of this type of powertrain remain the same.

The advantages of powertrain configuration 10a are: a) the structure is relatively simple, and the control strategies are also simple as a result; b) the ICE 20 and EM 24 in the system can be downsized since peak propulsion and regeneration loads are leveled by the flywheel-CVT system, and c) the operations of ICE 20 and EM 24 both be kept at optimal points for efficiency at a given speed for most driving conditions.

Possible demerits of this type of configuration included: a) no transmission in the ICE-EM branch, b) an additional moment of inertia may be needed at the starting phase due to fact the flywheel 12 will have a negative impact on low-speed acceleration performance, because the EM 24 will have to accelerate not only the inertia of the vehicle but also the moment of inertia of the flywheel 12, and c) there is only one path, i.e. CVT 14, for the flywheel 12 to charge and discharge its energy.

Figure 2:
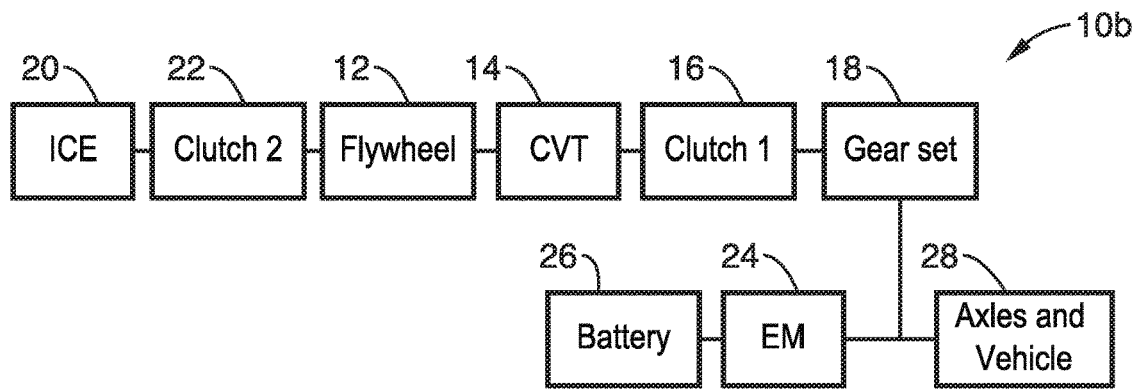
FIG. 2 shows a schematic view of a second configuration of a TESH powertrain.

FIG. 2 shows a schematic view of a second configuration of a Tri-Energy Source Hybrid (TESH) powertrain 10b where the EM 24 is directly linked to the drive shaft/vehicle axles 28 while ICE 20 is mechanically coupled to the flywheel 12 via a clutch.

In the configuration of powertrain 10b, the ICE 20 is connected to the drive shaft of axle 28 via a transmission, e.g. CVT 14. The energy stored in the flywheel 12 can be charged from the CVT 14 or ICE 20 while it can only be discharged via CVT 14. The speed of the flywheel 12 is limited by the speed range of the ICE 20, since it is mechanically coupled to the ICE 20. A first clutch 16 and gear set 18 are coupled between CVT 14 and vehicle axle 28, and a second clutch 22 couples flywheel 12 and ICE 20.

Variations, such as adding a gear set 18 between the ICE 20 and flywheel 12, can be made for this powertrain, while the characteristics of the powertrain remain the same.

Some advantages of the configuration of powertrain 10b are: a) the flywheel 12 can be charged directly by the ICE 20; b) the ICE 20 and EM 24 can be downsized, since peak propulsion and regeneration loads are leveled by the flywheel 12/CVT 14 system; c) the operations of ICE 20 and EM 24 can both be kept at an optimal points for efficiency at given speed for most driving conditions; and d) the CVT 14 also serves as the transmission for ICE 20

Possible demerits of the configuration of powertrain 10b are: a) an additional moment of inertia at the starting phase may be needed due to the flywheel 12 having a negative impact on low-speed acceleration performance; and b) the size of the CVT 14 is relatively large for this configuration since the power transmitted by it comes from both ICE 20 and flywheel 12.

Figure 3:
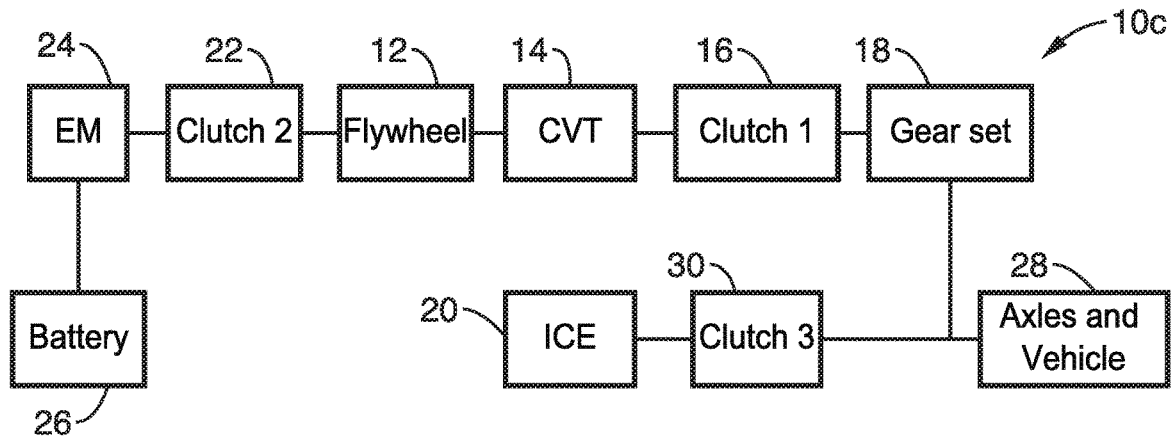
FIG. 3 shows a schematic view of a third configuration of a TESH powertrain.

FIG. 3 shows a schematic view of a third configuration of a Tri-Energy Source Hybrid (TESH) powertrain 10c. In the configuration of powertrain 10c, the ICE 20 is linked to the axle 28 drive shaft through a third clutch 30 while the EM 24 is mechanically coupled to the flywheel 12 via clutch 22. The EM 24 is connected to the axle 28 drive shaft via the flywheel 12 CVT 14, first clutch 18 and drive set 18. The energy stored in the flywheel 12 can be charged and discharged via CVT 14 or EM 24. The speed of the flywheel 12 is limited by the speed range of the EM 24 since the flywheel 12 is mechanically coupled to EM 24.

Variations, such as adding a transmission set (e.g. CVT) between ICE 20 and the axle 28 drive shaft or integrating the EM 24 rotor and the flywheel 12, can be made while the characteristics of the powertrain remain the same.

Some advantages of the configuration of powertrain 10c are: a) the flywheel 12 can be charged and discharged directly by the EM 24; b) the ICE 20 and EM 24 can be downsized, since peak propulsion and regeneration loads are leveled by the flywheel 12/CVT 14 system, c) the operations of the ICE 20 and EM 24 can both be kept at optimal points for both efficiency and emission for most driving conditions, and d) the CVT 14 also serves as the transmission for the EM 24.

Possible demerits of the configuration of powertrain 10c are: a) an additional moment of inertia at the starting phase may be needed due to the flywheel 12 having a negative impact on low-speed acceleration performance; b) the size of the CVT 14 is relatively large since the power transmitted by it comes from both ICE 20 and EM 24, and c) the ICE 20 is connected to the driveshaft without a transmission.

Figure 4:
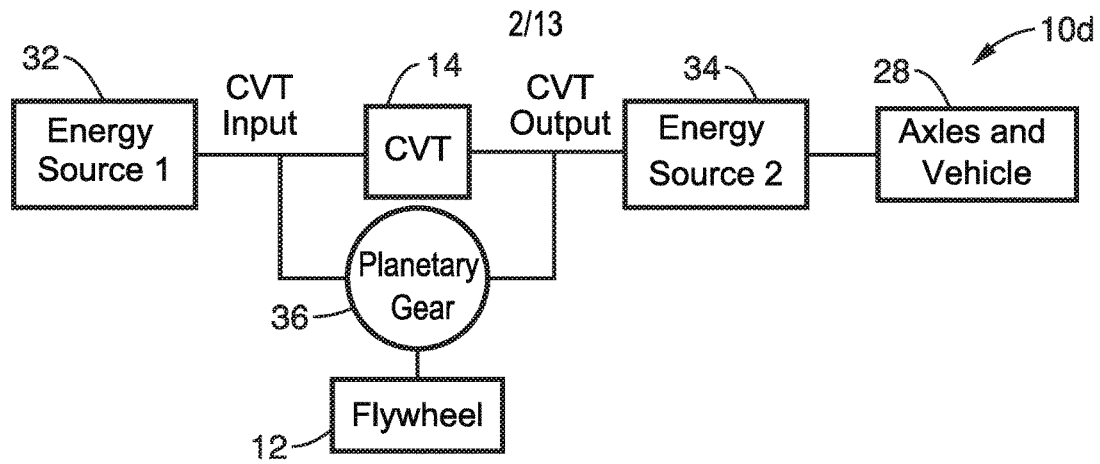
FIG. 4 shows a schematic view of a fourth configuration of a TESH powertrain.

In the previous three TESH configurations, the flywheel 12 is directly connected to the CVT 14 input shaft, so the power and torque transmitted provided by the flywheel 12 are limited by CVT 14 output capability. To further improve the output capability of the flywheel 12 energy storage system, a TESH powertrain configuration 10d comprising a CVT 14, flywheel 12, and planetary gear set 36 is shown in FIG. 4. The planetary gear set 36 is connected to the input shaft of CVT 14, the output shaft of CVT 14 and flywheel 12. The input shaft of CVT 14 is connected to first energy source 32 while the output shaft of the CVT 14 is connected to second energy source 34 and the axle 28 drive shaft. Energy flows into/out of the flywheel 12 via a planetary gear set 36.

TESH powertrain configuration 10d is detailed in FIG. 4 as a general expression of possible configurations of a TESH powertrain comprising first energy source 32, second energy source 34, a flywheel 12, CVT 14, planetary gear set 36. In one embodiment, first energy source 32 comprises EM 24, and second energy source 34 comprises ICE 20. In another embodiment, first energy source 32 comprises ICE 20, and second energy source 34 comprises EM 24.

In the TESH powertrain configuration 10d, energy will be extracted from the flywheel 12 when the driveline accelerates. In all three of the TESH powertrain configurations discussed above, energy can only be extracted from the flywheel 12 by reducing the CVT 14 gear ratio during driveline acceleration.

FIG. 4 does not specify which gear of the planetary gear set 36 is connected to the flywheel 12, CVT 14 input shaft or CVT 14 output shaft. It is appreciated that different configurations can be easily implemented by connecting the sun gear, ring gear and planetary carrier (all not shown) of the planetary gear 36 set to the different shaft of the CVT 14 or flywheel 12. Including the different locations of ICE 20 and EM 24, the total number of possible configurations for the structure depicted in FIG. 4 is 12.

Some advantages of the configuration of powertrain 10d are: a) the power flow of the flywheel 12 is no longer restricted by the CVT 14, b) the CVT 14 can serve as the transmission for the first energy source 32, c) the operations of the ICE 20 and EM 24 can both be kept at optimal points for both efficiency and emission for most of driving conditions.

Possible demerits of the configuration of powertrain 10d are: a) The structure and control are relatively complicated, b) part of the energy flow from the flywheel 12 will travel through both CVT 14 and the planetary gear set 36, the second energy source 34 is connected to the axle 28 driveshaft without a transmission.

Figure 5:
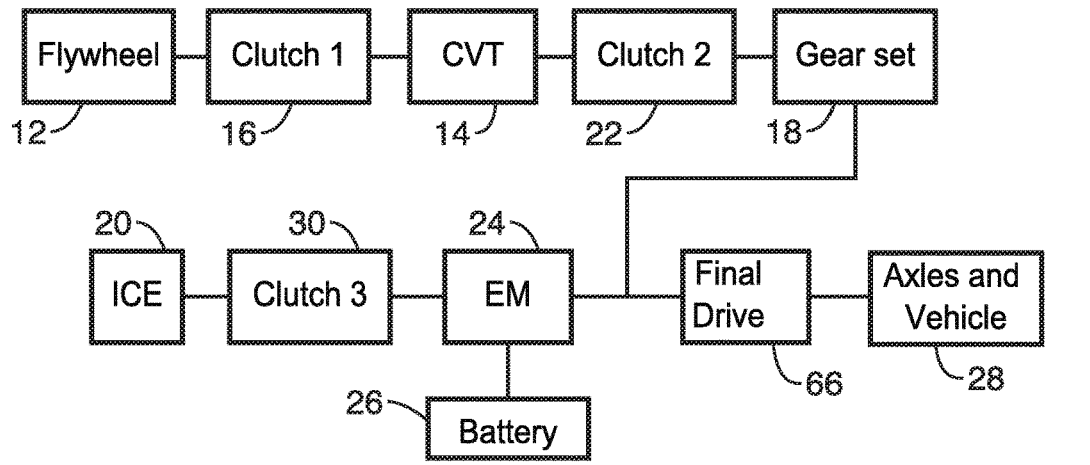
FIG. 5 shows a schematic view of a fifth exemplary configuration of a TESH powertrain.

FIG. 5 shows a schematic view of a fifth exemplary configuration of a Tri-Energy Source Hybrid (TESH) powertrain 10e. In the configuration of powertrain 10e, flywheel 12 is coupled to an HEV powertrain via a CVT 14, first and second clutches 16, 22 and gear set 18. The flywheel/CVT branch is coupled to the powertrain at the output end of EM 24, which powered by battery 26 and is coupled to ICE 20 through third clutch 30. The ICE-EM branch is the primary energy source for powering the axles and vehicle 28, and has no transmission but rather a final drive gear set 66 instead.

2. Tri-Energy Source Hybrid (TESH) Powertrain Model and Simulation a. TESH Model The major components of TESH powertrain include a battery 26, EM 24, ICE 20, flywheel 12, CVT 14 and gear set 18. It is beneficial to create easy to scale component models for the TESH powertrain, since sizing optimization of the components may be studied in the future. Many models, both generic and empirical, have been created these major components in previous studies. One of the most well-documented public databases of HEV components can be found in Advance Vehicle Simulator (ADVISOR). The data, such as efficiency of EM's and performance of the OCV curve of the battery 26, are either collected from published papers or experimentally tested at the National Renewable Energy Laboratory (NREL). With these data, quasistatic models of the EM 24, ICE 20 and Battery 26 can be created.

Fuel consumption of the ICE 20 which is defined by:

$$\eta_e = \frac{\omega_e \cdot T_e}{P_e}, \quad \text{Eq. 1}$$

$$\dot{m}_f = \frac{P_e}{H_l}, \quad \text{Eq. 2}$$

$$\dot{m}_f = \frac{\omega_e \cdot T_e}{P_e \cdot H_l}, \quad \text{Eq. 3}$$

where $\omega_e$ is the engine speed, $\eta_e$ is the thermodynamic efficiency, $T_e$ is engine output torque, $P_e$ is enthalpy flow, $H_l$ is the fuel's lower heating value, and $\dot{m}_f$ is the fuel mass flow. Besides the geometries, technologies and fuel type of the engine, $\eta_e$ is also dependent on engine speed and torque. Although there are different ways to estimate efficiency of ICE 20, for purposes of this disclosure the engine efficiency is calculated from the fuel consumption data stored in the ADVISOR database. Scaling of the component can be achieved by multiplying the scaling factors by the speed or the torque range of the efficiency map.

Electric machines, e.g. electric motors and generators, are key components in the TESH configurations of the present description. Usually, the electric machines (e.g. EM 24) in HEV are reversible, i.e. they can transform electric energy into kinetic energy and transform kinetic energy into electric energy. During different driving modes: the electric machine 1) converts electricity from the battery 26 to kinetic energy to propel the vehicle, 2) converts excessive propulsion from the engine to electricity, and 3) recovers kinetic energy when the vehicle slows down. The efficiency of the EM 24 is defined by Eq. 4:

$$\begin{cases} \eta_m = \frac{T_m \cdot \omega_m}{P_b}, & T_m > 0 \\ \eta_m = \frac{P_b}{T_m \cdot \omega_m}, & T_m < 0 \end{cases} \quad \text{Eq. 4}$$

where $\eta_m$ is the motor efficiency, $T_m$ is the torque generated by the motor, $P_b$ is the power provided by the battery 26 and $\omega_m$ is the motor speed. Positive torque means the motor is in traction mode and negative torque means the motor is in generator mode. For different types of motors, e.g. PMSMs and induction motors, as well for different windings and dimensions, the internal resistance, induction and mechanical loss are predicted via several methods. This will lead to very different EM efficiencies. In this description, the efficiencies of the EM at a given speed and output torque $\eta_m(T_m, \omega_m)$ is linearly interpolated from experimental data.

Scaling of the EM component can be achieved by multiplying the scaling factors to the speed or the torque range of the efficiency map.

The state of charge (SOC) of the battery is defined by:

$$SOC = \frac{Q(t)}{Q_{max}}, \quad \text{Eq. 5}$$

$$\dot{Q}(t) = -I_b, \quad \text{Eq. 6}$$

where SOC is the non-dimensional state of charge, $Q(t)$ is the capacity of the battery 26, $Q_{max}$ is the maximum capacity of the battery 26 and $I_b$ is the current drawn from the battery 26. A positive $I_b$ means the EM 24 operates as a motor and a negative $I_b$ means the EM 24 operates as a generator. $U_b$ is the voltage input from the battery 26.

Multiple equivalent circuits have been proposed to predict the steady state and transient response as well as the electrochemical phenomenon of the battery 26. The most commonly used models are: a) internal resistance model (Rint), b) Randles model, c) resistance-capacitance model (RC), and d) partnership for a new generation of vehicles (PNGV) capacitance model.

With the acceptable error and test data of $U_{oc}(SOC)$ and $R_i(T, SOC)$ from the ADVISOR database, the Rint model is implemented for battery 26 cell modeling in the following sections. After evaluation of the characteristics in Table 3, a NiMH battery 26 cell is chosen from the ADVISOR database for its moderate specific energy, moderate specific power and low cost compared to the other three battery 26 chemical choices. With the testing data of this battery 26 cell, the efficiency of the battery 26, $\eta_b$ can be derived:

$$\eta_n(SOC, I_b) = \begin{cases} e_{cou} \cdot \frac{U_{oc}(SOC) - I_b \cdot R_i(SOC)}{U_{oc}(SOC)}, & \text{discharge} \\ e_{cou} \cdot \frac{U_{oc}(SOC)}{U_{oc}(SOC) - I_b \cdot R_i(SOC)}, & \text{charge} \end{cases} \quad \text{Eq. 7}$$

where $e_{cou}$ is the coulombic efficiency.

Scaling of the battery 26 pack can be achieved by changing the number of battery 26 cells in the battery 26 pack. The SOC is estimated using Eq. 5, Eq. 6 and battery current $I_b$ established by Eq. 8:

$$I_b = \frac{U_{oc} - \sqrt{U_{oc}^2 - 4 \cdot P_b \cdot R_i}}{2 \cdot R_i}. \quad \text{Eq. 8}$$

In the TESH configurations of the present description, the transmission devices transmit mechanical power while regulating the output torque and speed. The major power transmission devices are the continuously variable transmission (e.g. CVT 14) and gear set 18 (also referred to as gear box.

The gear ratio r and efficiency n is defined in Eq. 9 and Eq. 10:

$$\omega_{out} \cdot r = \omega_{in},\qquad \text{Eq. 9}$$

$$\eta^{sign(-T_{in})} \cdot r \cdot T_{in} = T_{out},\qquad \text{Eq. 10}$$

where $\omega_{out}$, $\omega_{in}$, $T_{out}$ and $T_{in}$ are the output speed, input speed, output torque and input torque, respectively. Positive torque means the power is transmitting from the input end of the CVT 14/gear set 18 to the output, and the negative torque means the power is transmitting from the output end to the input end. $\eta_1$, the efficiency of the automotive gear set 18, is generally between 0.95 and 0.97. $\eta_{cvt}$, the efficiency of CVT 14, is a function of input torque, input speed and CVT 14 gear ratio. In one embodiment, the CVT comprises a hydraulic actuated push belt CVT 14.

In general, CVT 14 efficiency decreases with increasing input speed and decreasing input torque, and reaches maximal values for a gear ratio equal to one. With advanced slip control strategies, the efficiency of the CVT 14 can be maintained in the range between 0.90 and 0.95.

Figure 6:
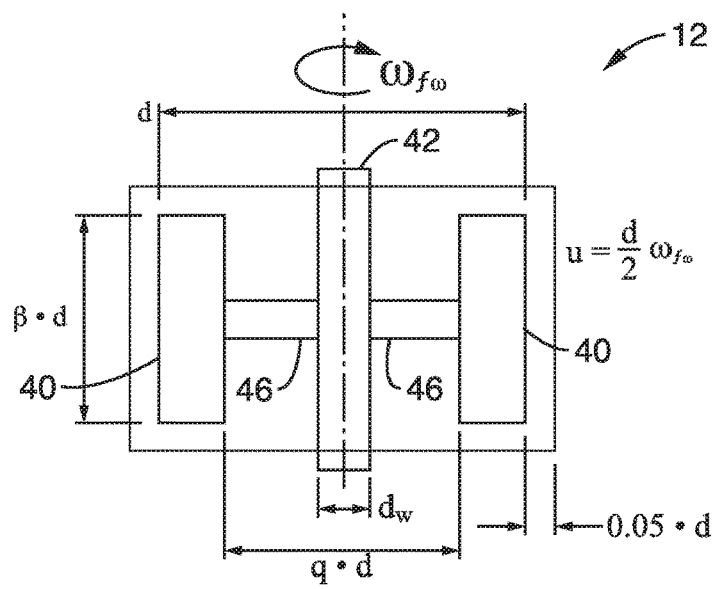
FIG. 6 shows a schematic diagram of an exemplary ring flywheel and its housing.

FIG. 6 shows a schematic diagram of an exemplary ring flywheel 12 and its housing. In FIG. 6, $\omega_{fw}$ is the speed of the flywheel 12, d is the flywheel 12 diameter at rim 40, u is the maximum linear speed of the flywheel 12, $d_w$ is the diameter of the flywheel 12 shaft 42 with arms 46 connecting the rim 40 and shaft 42, $\beta$ and q are the non-dimensional coefficients. The flywheel 12 moment of inertia is denoted as $J_{fw}$ and is calculated according to:

$$J_{fw} = \rho \cdot \beta \cdot d \int_{q\frac{d}{2}}^{\frac{d}{2}} r^2 \cdot 2 \cdot \pi \cdot r\, dr = \frac{\pi \cdot \rho \cdot \beta \cdot d}{32}(1-q^4)\cdot d^4,\qquad \text{Eq. 11}$$

$$m_f = \pi \cdot \rho \cdot \beta \cdot d \frac{d^2}{4}\cdot(1-q^2).\qquad \text{Eq. 12}$$

The kinetic energy stored in the flywheel 12 is $E_{fw}$:

$$E_{fw} = \tfrac{1}{2} J_{fw} \omega_{fw}^2.\qquad \text{Eq. 13}$$

Under the assumption of a thin ring, the maximum hoop stress $\sigma_{max}$ in the flywheel 12 is:

$$\sigma_{max} = \frac{\rho \cdot r^2 \cdot \omega_{max}^2}{4}.\qquad \text{Eq. 14}$$

As an energy storage system, one of the most important characteristics of the flywheel 12 is the capacity of stored energy. From Eq. 13 and Eq. 14, the capacity is limited by the maximum yielding strength of flywheel 12 rotor material and the maximum rotational speed of the flywheel 12.

The power loss of the flywheel 12 is denoted as $P_l$. $P_l$ takes into account both $P_a$, i.e. air resistance loss, and $P_b$, i.e. bearing loss. For Reynolds number greater than $3 \cdot 10^5$:

$$P_{l,a} = 0.04 \cdot \rho_a^{0.8} \cdot \eta_a^{2.8}(t) \cdot d_{1.8} \cdot (\beta+0.33),\qquad \text{Eq. 15}$$

where $\eta_a$ and $\rho_a$ are the dynamic viscosity and density of air in the flywheel 12 chamber, and:

$$P_{l,b} = \mu \cdot k \cdot \frac{d_w}{d} \cdot m_f \cdot g \cdot u(t),\qquad \text{Eq. 16}$$

where g is the Newtonian constant of gravitation, $\mu$ is the friction coefficient and k is a corrective force factor that models unbalance and gyroscopic forces.

The total torque loss of the flywheel 12 is $T_l$:

$$T_l = 0.0574 \cdot \rho_a^{0.8} \cdot \eta_a^{0.2} \cdot d^{4.8} \cdot (\beta+0.33)\cdot \omega_{fw}^{1.8} + 0.5 \cdot \mu \cdot k \cdot d_w \cdot m_f \cdot g.\qquad \text{Eq. 17}$$

Assuming $\alpha_1 = 0.0574 \cdot \rho_a^{0.8} \cdot \eta_a^{0.2} \cdot d^{4.8} \cdot (\beta+0.33)$ and $\alpha_2 = 0.5 \cdot \mu \cdot k \cdot d_w \cdot m_f \cdot g$, Eq. 17 can be simplified as:

$$T_l = \alpha_1 \cdot w_{fw}^{1.8} + \alpha_2.\qquad \text{Eq. 18}$$

The equation of motion of the flywheel 12 is:

$$\dot{\omega}_{fw} = (-T_1 - T_l)/J_{fw}\qquad \text{Eq. 19}$$

where $\omega_{fw}$ is the angular speed of the flywheel 12, and $T_1$ is the torque applied by the flywheel 12.

With the components discussed above, many different kinds of powertrain configurations can be modeled, as detailed in FIG. 1 through FIG. 5.

In TESH powertrain configurations 10b and 10c shown in FIG. 2 and

FIG. 3, the maximum speed of the flywheel 12 is limited by the maximum speed of the ICE 20 or EM 24. For purposes of the present description, only TESH powertrain configuration 10a shown in FIG. 1 is modeled and simulated.

Figure 7:
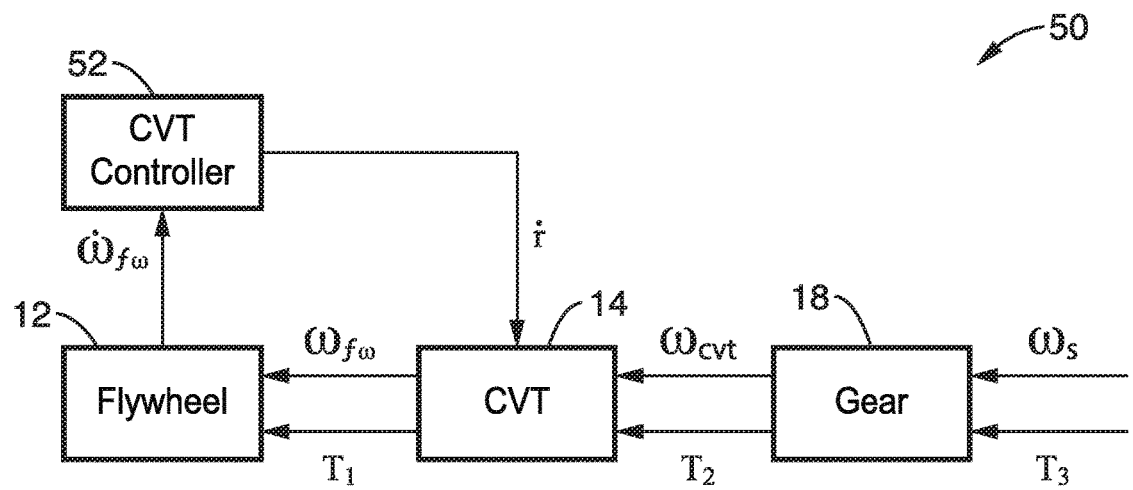
FIG. 7 shows a schematic diagram of a quasi-static model of a SESS subsystem incorporating a flywheel/CVT power source.

FIG. 7 shows a schematic diagram of a quasi-static model of a SESS subsystem 50 incorporating a flywheel 12/CVT 14 power source. The flywheel 12 is connected to the input end of the CVT 14 while the output end of the CVT 14 is connected to the drive shaft (axle 28) via a gear set 18. $T_1$, $T_2$, and $T_3$, are the torque applied to the CVT 14 input end, the torque applied to the input end of the gear set 18 and the torque applied to the driveshaft, respectively. $\omega_{fw}$, $\omega_{cvt}$ and $\omega_s$ are the speed of the flywheel 12, the speed of the CVT 14 output end, and the speed of the driveshaft, respectively. The gear ratio of CVT 14 is r and the change rate of this gear ratio is denoted as $\dot{r}$. Assume that the moment inertias of CVT 14 components are negligible compared to flywheel 12 and the vehicle inertia, the control output $\dot{r}$ from the CVT 14 controller 52 can be derived from Eq. 9. Eq. 10 and Eq. 19 to yield:

$$\dot{r} = -\left[\frac{T_1 * r_{cvt} + T_2 \cdot \eta_{cvt}^{sign(-T_2)}}{J_{fw} \cdot r_{cvt}} + r_{cvt} \cdot \dot{\omega}_{cvt}\right]/\omega_{cvt}.\qquad \text{Eq. 20}$$

Figure 8:
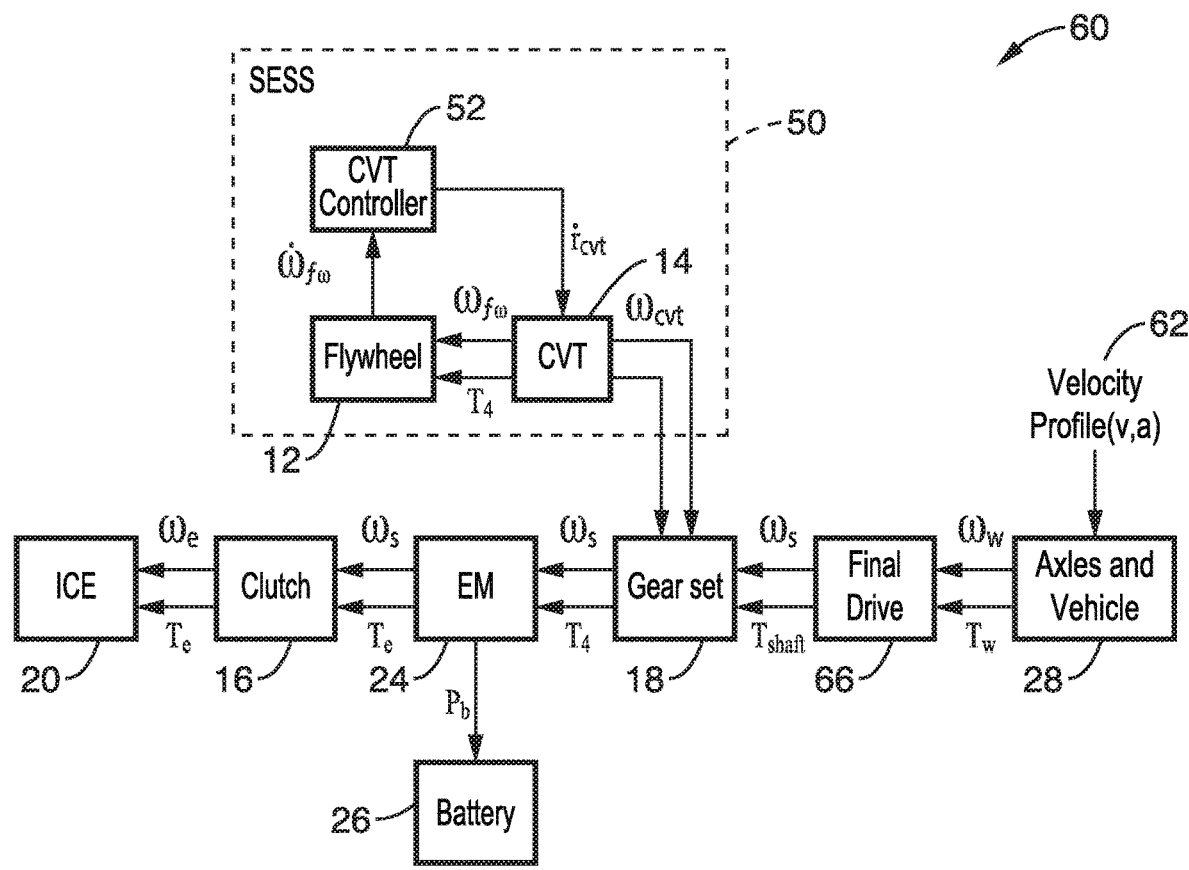
FIG. 8 shows a schematic diagram of a quasi-static model of a TESH powertrain.

FIG. 8 shows a schematic diagram of a quasi-static model of TESH powertrain 60 incorporating the SESS subsystem 50 of FIG. 7 with torque demand $T_3$ ($T_{shaft}$), including ICE 20, clutch 16, EM 24, battery 26, final drive 66, gear set 18, and vehicle axle 28 according to velocity profile 62.

The elementary equation that describes the longitudinal dynamics of the vehicle is:

$$J_{eq} \cdot \dot{\omega}_w = T_w - T_{road}.\qquad \text{Eq. 21}$$

where $J_{eq}$ is the equivalent moment of inertia of the vehicle mass and the rotational parts in the powertrain, $\omega_w$ is the wheel speed, and $T_w$ is the torque at wheel, and $T_{road}$ is the equivalent torque of the road load.

Wheel speed $\omega_w$ may be calculated according to:

$$\omega_w = v/R_w,\qquad \text{Eq. 22}$$

where $R_w$ is the radius of the wheel and v is the velocity of the vehicle, and $$J_{eq} = m_v \cdot R_w^2 + (J_e + J_m) \cdot r_f^2 \cdot \eta_f^{sign(-T_s)}\qquad \text{Eq. 23}$$

where $m_v$ is the mass of the vehicle. $\eta_f$, $\eta_1$ and $\eta_c$ are the efficiency of the final drive 66, gear set 18, and CVT 14, respectively. $r_f$, $r_1$ and r are the gear ratio of the final drive 66, gear set 18, and CVT 14, respectively. $J_e$ and $J_m$ are the moment of inertia of the engine and EM 24, respectively. The moment of inertia of flywheel 12 and CVT 14 are not included in Eq. 23, as they are included in dynamic equations of the SESS 50 such as Eq. 18. The torque at wheel $T_w$ is calculated according to Eq. 24:

$$T_w = [(T_e + T_m) + T_1 \cdot r_c \cdot \eta_c^{sign(T1)} \cdot r_1 \cdot \eta_1^{sign(T1)}] \cdot r_f \cdot \eta_f^{sign(Ts)}. \quad \text{Eq. 24}$$

The equivalent road load is defined as:

$$T_{road} = R_w \cdot [0.5 \cdot \rho \cdot C_D \cdot A_F \cdot V_{rel}^2 + m_v \cdot g \cdot (\cos\theta \cdot C_R + \sin\theta)], \quad \text{Eq. 25}$$

where $\rho$, $C_D A_F$, $V_{rel}$, g, $C_R$, $\theta$ are the density of the air, aerodynamic drag coefficient, vehicle area normal to the direction of travel, gravitational constant, rolling resistance coefficient, and inclined angle of road. The governing equation of motion can be written as:

$$[m_v \cdot R_w^2 + (J_e + J_m) \cdot r_f^2 \cdot \eta_f^{sign(-Ts)}] \cdot \dot{\omega}w = \{(T_e + T_m) - [J_{fw} \cdot (\omega_{cvt} \cdot r + \omega_{cvt} \cdot \dot{r}) + T_l] \cdot r_1 \cdot \eta_1^{sign(T1)} \cdot r \cdot \eta^{sign(-\dot{r})}\} \cdot r_f \cdot \eta_f^{sign(T1)} - R_w \cdot [0.5 \cdot \rho \cdot C_D \cdot A_F \cdot V_{rel}^2 + m_v \cdot g \cdot (C_R + \sin\theta)].$$

The battery 26 model used in the quasi-static approach/backward facing approach is the Rint model. Bearing loss $P_b$ is calculated according to Eq. 27:

$$P_b = \eta_m^{-sign(Tm)} \cdot \omega_s \cdot T_m. \quad \text{Eq. 27}$$

A Simulink model used for simulating the drivetrain of the present description utilizes a gear set 18 connected to the CVT 14 output end that is integrated into the CVT 14 for simplicity. The high-level strategy of the Simulink model is:

1) The shaft speed, shaft acceleration and torque demands at shaft are calculated in the vehicle model.

2) The control modules of the vehicle collect shaft speed, shaft acceleration, shaft torque demand, battery SOC and CVT 14 gear ratio then calculates the torque demands sent to the ICE 20, motor and SESS.

3) With the torque demand and shaft speed from the controller, ICE 20 model returns the fuel consumption rate; the CVT 14/flywheel 12 system returns the CVT 14 gear ratio and the EM 24 returns the electric power to calculate the battery SOC.

In the Simulink model, a controller (not shown) generates torque demands to ICE 20, EM 24, and SESS 50. The shaft speed and the shaft torque demand are the inputs to this controller, while the controller also collects more information such as the SOC of the battery 26, gear ratio rate of the CVT 14, etc. While many different kinds of optimization control algorithms have been developed for hybrid vehicle powertrains such as fuzzy logic controls, equivalent consumption minimization strategies and dynamic programming control, a rule-based control algorithm was used and implemented in simulations.

A high-level control algorithm of TESH powertrain control incorporates vehicle high-level modes including stop mode, regenerative braking mode, and propulsion mode. The propulsion mode can be further divided into high-speed and low-speed mode since during propulsion mode, the engine only operates above a certain speed to ensure a high fuel efficiency. In the TESH powertrain, the different operation modes can be then further divided by the 18 operation modes according to different operating states of the ICE 20, EM 24, and SESS 50. In Table 4, +1, 0, −1 represents the positive torque, zero torque, and negative torque, respectively, for ICE 20, EM 24, and SESS 50.

Table 5 demonstrates the operation modes shown in Table 4 that are associated with the three High-Level Modes of the TESH Powertrain.

With the models and control strategy designed in previous sections, different components' sizing and vehicle dimensions can be implemented. In the simulation, the vehicle specs are extracted from an existing class 5 truck and the specs of the major components are chosen from the ADVISOR data base.

The drive cycle chosen for this simulation is the Urban Dynamometer Driving Schedule (UDDS) drive cycle. The UDDS drive cycle is normally recommended for light-duty vehicle testing by the Environment Protection Agency (EPA), due to its volatile accelerations. Although the simulated vehicle is a class 5 truck, UDDS is chosen to test the performance of the TESH powertrain in which ICE 20 and EM 24 are mechanically coupled to the drive shaft without a transmission.

b. TESH Simulation Results

An important goal of the simulation is to establish that the TESH powertrain if the present description is capable of delivering the traction and brake torques to meet the drive cycle with all the components of the powertrain operating within their rated limits.

Figure 9A:
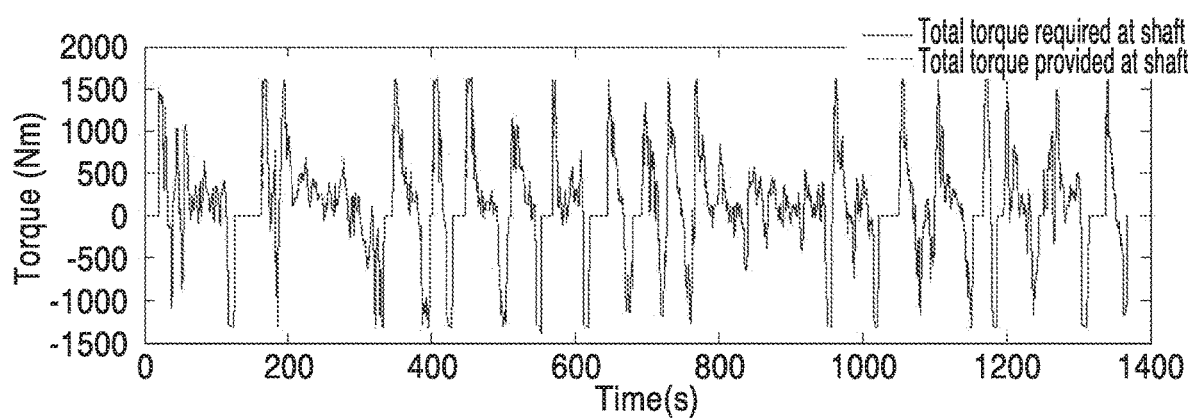
FIG. 9A shows a plot of the torque demand at the shaft.
Figure 9B:
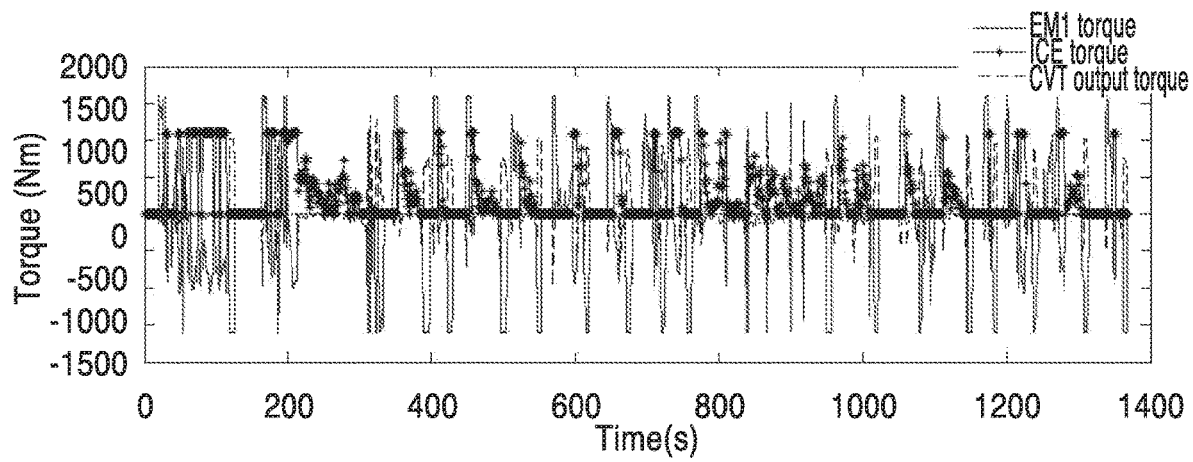
FIG. 9B shows a plot of the resulting torque supplied by the ICE, EM, and SESS individually.

FIG. 9A shows a plot of the torque demand at the shaft and FIG. 9B shows a plot of the resulting torque supplied by the ICE 20, EM 24, and SESS 50 individually. FIG. 9A illustrates that the torque demands at driveshaft are met with only a few discrepancies caused by the discrete nature of the simulation.

Figure 10A:
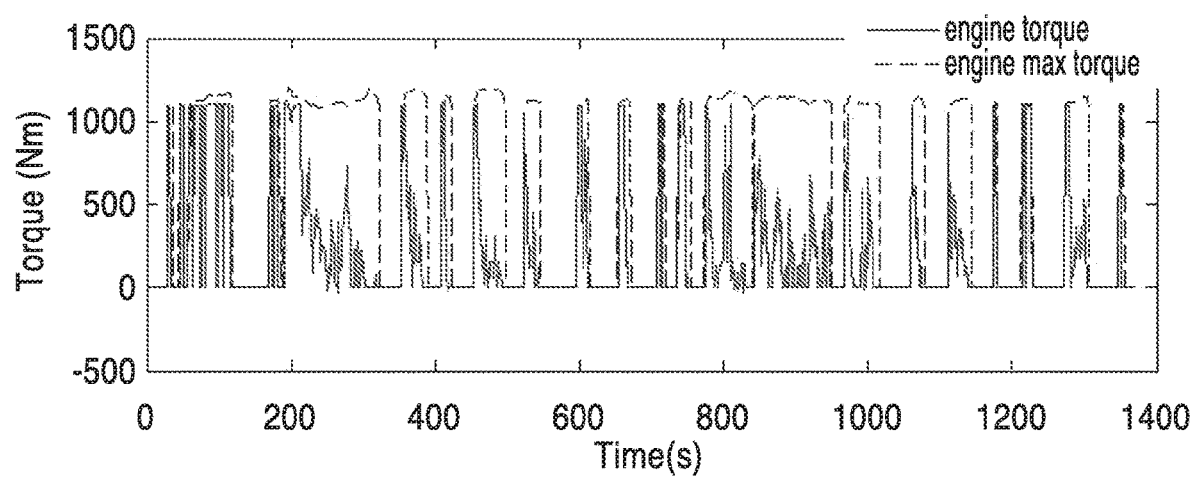
FIG. 10A shows a plot of the torque supplied by the ICE.
Figure 10B:
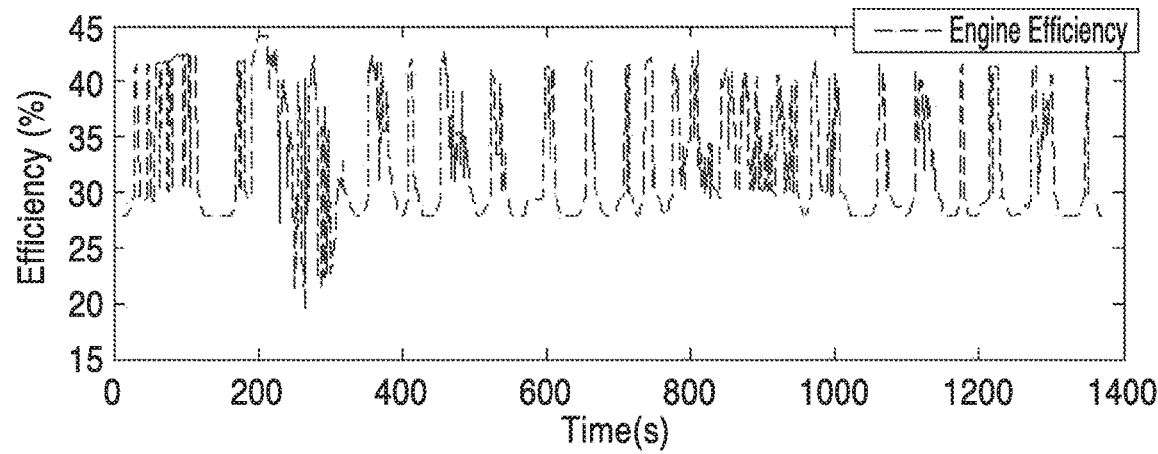
FIG. 10B shows a plot of the efficiency of the ICE.

FIG. 10A shows a plot of the torque supplied by the ICE 20 and FIG. 10B shows a plot of the efficiency of the ICE 20. These figures demonstrate that the ICE 20 does not operate beyond its torque limits, and a majority of the ICE 20 operation points are located at efficiency higher than 27%.

Figure 11:
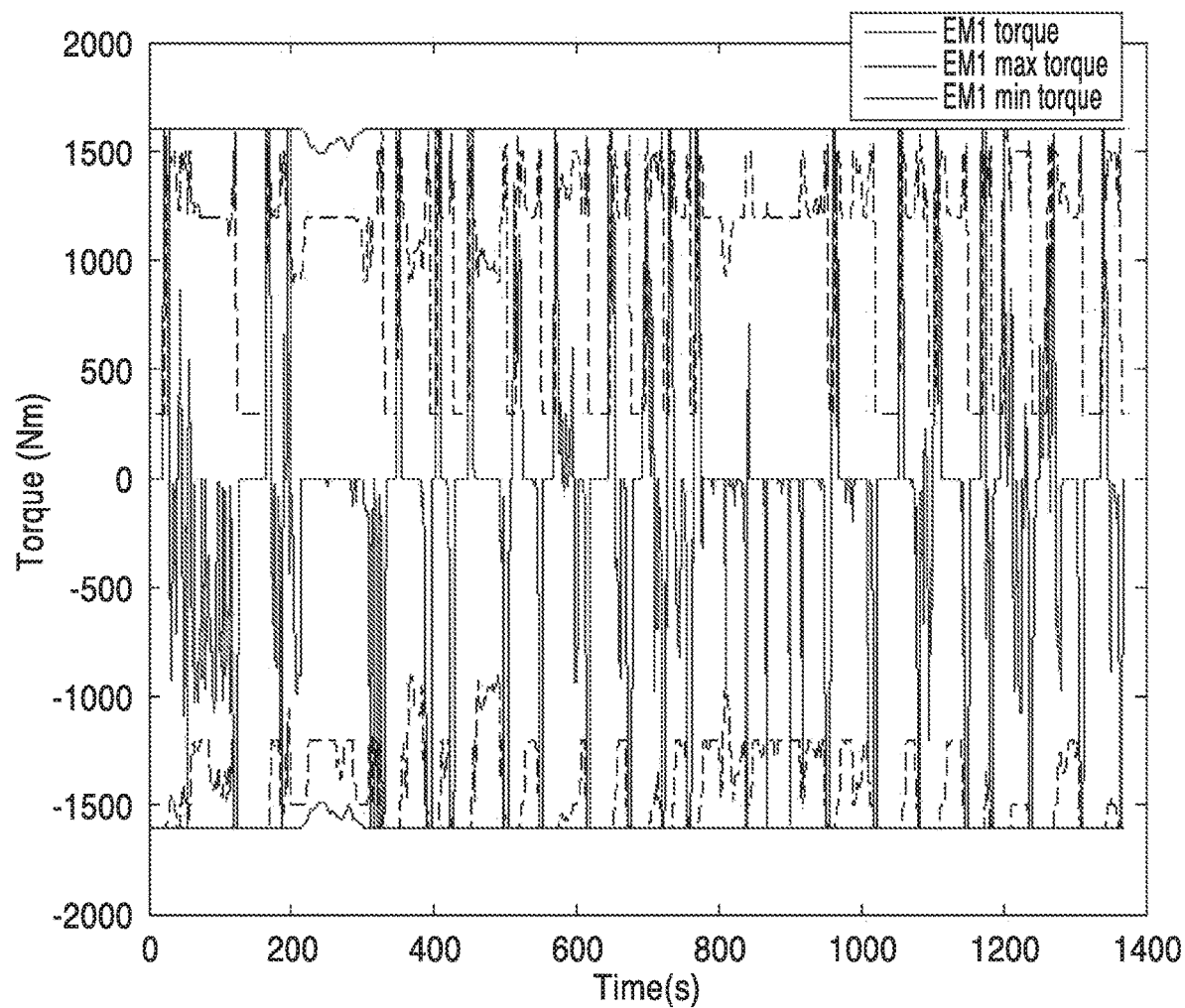
FIG. 11 shows a plot of the torques supplied by the EM.

FIG. 11 shows a plot of the torques supplied by the EM 24. FIG. 11 illustrates shows the EM 24 operates within its torque limits. More importantly, FIG. 11 confirms that EMs in current TESH configuration with the heuristically designed control algorithm operates very often at optimal efficiency operation states compared to typical EMs in HEV.

Figure 12:
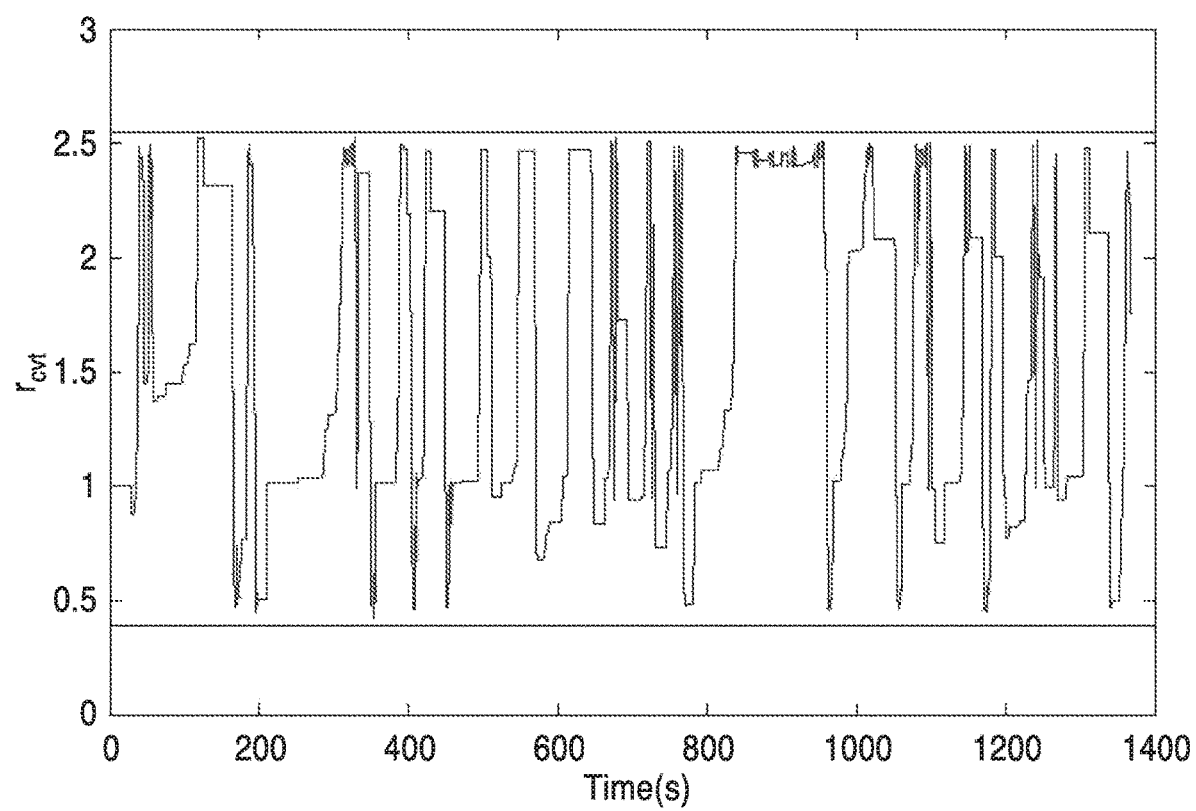
FIG. 12 shows a plot of the gear ratio of the CVT.

FIG. 12 shows a plot of the gear ratio of the CVT 14. FIG. 12 demonstrates that the SESS 50 is frequently charged and recharged during the drive cycle within its gear ratio range.

Figure 13A:
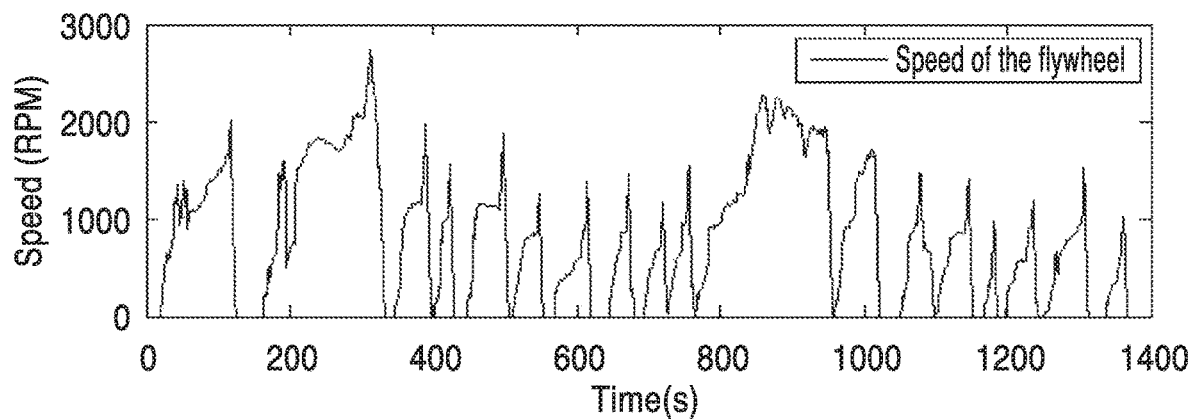
FIG. 13A shows a plot of the speed of the flywheel.
Figure 13B:
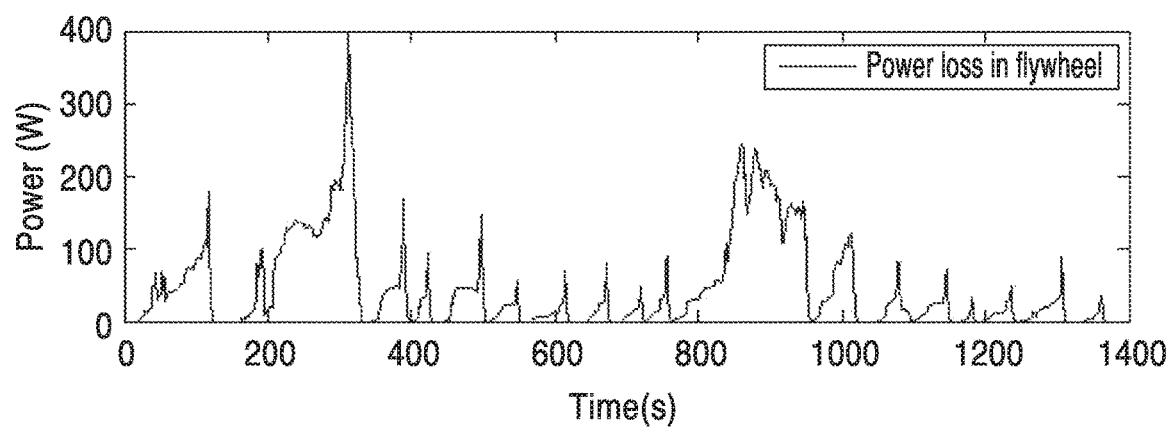
FIG. 13B shows a plot of the power loss of the flywheel.

FIG. 13A shows a plot of the speed of the flywheel 12. FIG. 13B shows a plot of the power loss of the flywheel 12. FIG. 13A illustrates that the maximum speed of the flywheel 12 during the drive cycle is only 3500 RPM, which is significantly lower than the speed limit of the steel flywheel 12 chosen for the simulation. As shown in FIG. 13B, the power loss due to aerodynamic drag and bearing friction in a sealed but non-vacuum flywheel 12 chamber peaked at 400 W while it remains below 200 W for the majority of the drive cycle.

In conclusion, the results of the simulation show that all the major components in the TESH powertrain work inside their limits when they provide adequate traction and regenerative braking torques for the vehicle to meet the velocity of the drive cycle. The simulation results indicate that the TESH powertrain and its control strategy have promising features, such as both the ICE 20 and EM 24 operating at high-efficiency range while the energy loss in SESS 50 due to the aerodynamic drag and bearing friction is kept relatively low.

Although the models for each component and subsystem are developed with scaling capability, component sizing was not simulated. It is appreciated that the demonstrated TESH powertrain may be configured to scale the components of the TESH powertrain to reach optimization goals such as weight, cost, and fuel economy of the powertrain. The rule-based control strategy in this chapter is designed heuristically and yields an adequate simulation result. Different optimization controls may also be implemented for the disclosed powertrain configuration to produce better fuel economy and emissions.

3. Control Strategies for TESH Powertrain

In this section, the general form of the control optimization problem for the Tesh is discussed. Although there are many different topologies possible for a TESH powertrain (e.g. TESH powertrains detailed in FIG. 1 through FIG. 5, only the configuration of FIG. 5 is modeled and simulated in this section. To study the control and optimization of the TESH powertrain, three different kinds of control strategies are implemented. The Dynamic Programming (DP) is implemented first, and the result of it is used as a baseline since it delivers the global optimal. The rule-based control strategy is designed and tuned for a particular drive cycle in an attempt to match the baseline results. The third control strategy is an Equivalent Consumption Minimization Strategy derived for the TESH powertrain incorporating the energy dissipation effect in the SESS.

Figure 14:
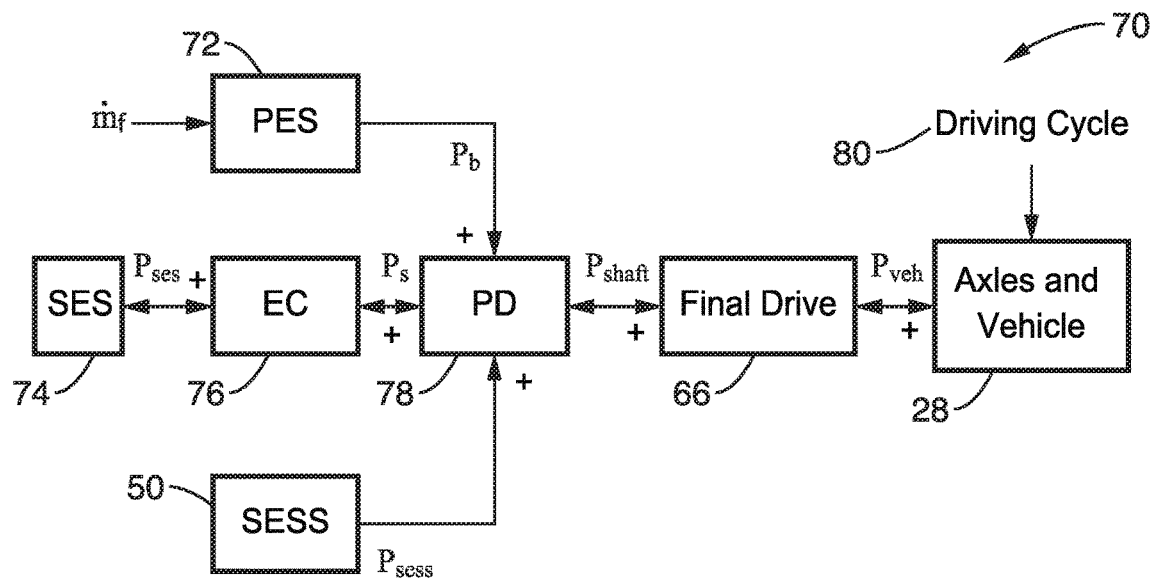
FIG. 14 shows a schematic diagram of a TESH powertrain.

One of the general representations of the Tri-Energy Storage Hybrid powertrain is shown in FIG. 14, which shows one possible TESH configuration 70, comprising a Primary Energy Source (PES) 72, Secondary Energy Source (SES) 74, Energy Convertor (EC) 76, Short-term Energy Storage System (SESS) 50, Power Distributer (PD) 78 final drive 66 and vehicle axles 28 according to driving cycle 80. In FIG. 14, $\dot{m}_f$ stands for the mass flow of the fuel. $P_P$, $P_{ses}$, $P_s$, $P_{sess}$, and $P_{shaft}$ are the power supplied by the PES 72, SES 74, EC 76, SESS 50, and the driveshaft of axles 28. The + sign on the arrow denotes the positive power flow directions.

Where modeling the configuration of powertrain 10e of FIG. 5, the ICE 20 is the PES 22, the battery 26 is the SES; the EM 24 is the EC 76; the PD 78 is gear set 18. The SESS 50 comprises of a flywheel 12 and a mechanical CVT 14 as detailed in FIG. 7. The quasi-static model of the TESH powertrain may be seen with reference to model 60 shown in FIG. 8. The power demand for the vehicle $P_{veh}(t)$ follows the drive cycle 80 and it is a function of time.

Some of the goals for optimization in a control problem of a TESH powertrain include fuel consumption, nitrogen oxide emission, and hydrocarbon emission. The cost function J to minimize the fuel consumption over a time interval $[t_0, t_f]$ is defined in Eq. 28, in which $\dot{m}_f$ is the fuel consumption rate:

$$J = \int_{t_0}^{t_f} \dot{m}_f dt \qquad \text{Eq. 28}$$

Different powertrain topologies, load conditions, and the component states will result in different control inputs u(t). However, both control inputs and the states of the components need to follow the constraints for any t ∈ $[t_0, t_f]$:

$$P_{p,min} \leq P_p(t) \leq P_{p,max} \qquad \text{Eq. 29}$$

$$P_{s,min} \leq P_s(t) \leq P_{s,max} \qquad \text{Eq. 30}$$

$$P_{ses,min} \leq P_{ses}(t) \leq P_{ses,max} \qquad \text{Eq. 31}$$

$$P_{sess,min} \leq P_{sess}(t) \leq P_{sess,max} \qquad \text{Eq. 32}$$

$$SOC_{ses,min} \leq SOC_{ses}(t) \leq SOC_{ses,max} \qquad \text{Eq. 33}$$

$$SOC_{sess,min} \leq SOC_{sess}(t) \leq SOC_{sess,max} \qquad \text{Eq. 34}$$

The state of charges for SES 74 and SESS 50 are $SOC_{ses}(t)$ and $SOC_{sess}(t)$, detailed definitions for which are discussed below with specific technology choices for the energy storage system. The control input u(t) and the states of the system x(t) can be defined as:

$$u(t) = [P_{ses}(t), P_{sess}(t)]^T \qquad \text{Eq. 35}$$

$$x(t) = [SOC_{ses}(t), SOC_{sess}(t)]^T. \qquad \text{Eq. 36}$$

The general constraint for the input u(t) is defined as:

$$u(t) \in U(t). \qquad \text{Eq. 37}$$

where U(t) is the set of admissible controls that satisfy the conditions described in Eq. 29 to Eq. 32. The constraints for the states of the system can be defined by the auxiliary function $G(t) = [G_{1,max}(t), G_{1,min}(t), G_{2,max}(t), G_{2,min}(t)]^T$, where:

$$G_{1,max}(t) = (x_1(t) - x_{1,max}) \leq 0, \qquad \text{Eq. 38}$$

$$G_{1,min}(t) = (x_{1,min} - x_1(t)) \leq 0, \qquad \text{Eq. 39}$$

$$G_{2,max}(t) = (x_2(t) - x_{2,max}) \leq 0, \qquad \text{Eq. 40}$$

$$G_{2,min}(t) = (x_{2,min} - x_2(t)) \leq 0. \qquad \text{Eq. 41}$$

The general form of the dynamic equations of the systems is defined in Eq. 42 and the dynamic equations for specific powertrain topology are defined by choices for the topology and technologies for the TESH powertrain:

$$\dot{x}(t) = f(x, u, t). \qquad \text{Eq. 42}$$

To form the control problem of the TESH powertrain 70 depicted in FIG. 14 for optimization, the equations in the previous section needs to be converted while the expression of the cost function of J remains unchanged. The states x(t) and u(t) can be expressed as:

$$u(t) = [P_b(t), P_{sess}(t)]^T, \qquad \text{Eq. 43}$$

$$x(t) = [SOC(t), r_{cvt}(t)]^T, \qquad \text{Eq. 44}$$

where SOC(t) is the state of charge of the battery 26; $r_{cvt}(t)$ is the gear ratio of the CVT 14; $P_b(t)$ is the power output of the battery 26; and $P_{sess}(t)$ is the power output of the SESS 50. The gear ratio of the CVT 14 is chosen as one of the state variables instead of the percentage ratio of the energy stored in the flywheel 12 to the maximum energy storage capacity of the flywheel 12 at the instance. Since the maximum speed of the flywheel 12 continue to charge with the speed of the driveshaft due to the mechanical coupling between the flywheel 12 and drive shaft, the maximum energy the flywheel 12 is capable of storing keeps changing. The definition of $P_b(t)$, $P_{sess}(t)$, SOC(t), and $r_{cvt}(t)$ are defined as the following:

$$P_b(t) = U_b(t) \cdot I(t) \qquad \text{Eq. 45}$$

$$P_{sess}(t) = \omega_{cvt}(t) \cdot T_2(t) \qquad \text{Eq. 46}$$

$$SOC(t) = \frac{E_b(t)}{E_{b,max}(t)}, \qquad \text{Eq. 47}$$

$$r_{cvt}(t) = \frac{\omega_{fw}(t)}{\omega_{cvt}(t)}, \qquad \text{Eq. 48}$$

where $E_b(t)$ and $E_{b,max}(t)$ are the energy stored in the battery 26 and the maximum energy storage capacity of the battery 26 respectively.

G(t), the constraints of the state, can be rewritten as:

$$G_{1,max}(t)=(SOC(t)-SOC_{max})\leq 0, \quad \text{Eq. 49}$$

$$G_{1,min}(t)=(SOC_{min}-SOC(t))\leq 0, \quad \text{Eq. 50}$$

$$G_{2,max}(t)=(r_{cvt}(t)-r_{cvt,max})\leq 0, \quad \text{Eq. 51}$$

$$G_{2,min}(t)=(r_{cvt,min}-r_{cvt}(t))\leq 0. \quad \text{Eq. 52}$$

The dynamic equation of state of charge of the battery 26 can be written as:

$$S\dot{O}C(x,u,t) = -\frac{T_m \cdot \omega_s}{E_{b,max} \cdot \eta_b^{sign(T_m)}(SOC,P_b) \cdot \eta_b^{sign(I)}(SOC,P_b)} = \quad \text{Eq. 53}$$

$$-\frac{P_b(t)}{E_{b,max} \cdot \eta_b^{sign(P_b(t))}(SOC,P_b)}$$

where $\eta_b$ is the efficiency of the battery 26 and is defined in Eq. 7. $\eta_b$ is a function of battery SOC, i.e. $x_1$, and battery output power $P_b$, i.e. $u_1$.

The dynamic equation of the gear ratio of the CVT 14 can be written as:

$$\dot{r}_{cvt}(x,u,t) = \quad \text{Eq. 54}$$

$$-\frac{\left[\frac{T_l(r_{cvt},t)\cdot r_{cvt} + T_2 \cdot \eta_{cvt}^{sign(-T_2)}(r_{cvt},P_{sess})}{J_{fw}\cdot r_{cvt}} + r_{cvt}\cdot \dot{\omega}_{cvt}\right]}{\omega_{cvt}} =$$

$$-\frac{\left[T_l(r_{cvt},t)\cdot r_{cvt}\cdot \omega_{cvt} + P_{sess}\cdot \eta_{cvt}^{sign(-P_{sess})}(r_{cvt},P_{sess}) + J_{fw}\cdot r_{cvt}^2 \cdot \omega_{cvt}\cdot \dot{\omega}_{cvt}\right]}{J_{fw}\cdot r_{cvt}\cdot \omega_{cvt}^2}$$

where $J_{fw}$ is the moment of inertia of the flywheel 12, $\eta_g$ is the efficiency of the gear set 18, and $T_1(t)$ is the torque loss in the flywheel 12. While $T_1(t)$ can be obtained experimentally or analytically, in the present description this loss is obtained analytically.

The initial and final states can be expressed as:

$$SOC(t_0)=SOC_{ini}, \quad \text{Eq. 55}$$

$$r_{cvt}(t_0)=r_{cvt,ini}, \quad \text{Eq. 56}$$

$$SOC(t_f)\in SOC_{ini}\pm \delta_1, \quad \text{Eq. 57}$$

$$r_{cvt}(t_f)\in r_{cvt,ini}\pm \delta_2, \quad \text{Eq. 58}$$

where $\delta_1$ and $\delta_2$ are the deviations from the initial states of the battery SOC and the CVT 14 gear ratio respectively.

Lastly, $\dot{m}_f$, which is the fuel flow rate, can be expressed as a function of the state variables, control inputs and time. With a fuel consumption map that is empirically obtained, $$\dot{m}_f = f(T_e(x,u,t),\omega_e(t)). \quad \text{Eq. 59}$$

The speed of the engine, i.e. $\omega_e(t)$, can be expressed as:

$$\omega_e(t) = \begin{cases} \frac{v(t)\cdot r_f}{R_w} & \text{when the clutch is enaged} \\ 0 & \text{when the cltuch is disengaged} \end{cases} \quad \text{Eq. 60}$$

where $r_f$ is the gear ratio of the final drive 66 and $R_w$ is the radius of the wheels.

The torque provided by the engine, i.e. $T_e$ can be expressed as:

$$T_e(x,u,t) = \frac{P_e(x,u,t)}{\omega_e} = \quad \text{Eq. 61}$$

$$\frac{P_{veh}(x,t)\cdot \eta_f^{sign(-P_{veh})} - P_{sess}\cdot \eta_g^{sign(P_{sess})} - P_b \cdot \eta_m^{sign(P_b)}}{\omega_e},$$

where, $\eta_f$, $\eta_g$, and $\eta_m$ are the efficiency of the final drive 66, gear set 18 and electric motor respectively. $\eta_m$ is a function of $P_b$, i.e. $u_1$, and $\omega_s(t)$ while $\eta_f$ and $\eta_g$ are considered constants.

For the chosen TESH powertrain, the power consumption, i.e. $P_{veh}$, is a function of control inputs. The elementary equation that describes the power consumption of the vehicle is:

$$P_{veh}(P_m,P_{ses},t)=m_{eq}(P_m,P_{sess},t)\cdot \dot{v}(t)+F_{road}\cdot v(t), \quad \text{Eq. 62}$$

where $m_{eq}$ is the equivalent mass of the vehicle at the wheel and the rotational parts in the powertrain. $F_{road}$ is the resulting force of the road loads including aerodynamic drag, rolling resistance and force due to the slope of the road. The equivalent mass of the vehicle can be written as:

$$m_{eq} = m_v + \frac{(J_e + J_m)\cdot r_f^2 \cdot \eta_f^{sign(-T_4)}}{R_w^2}, \quad \text{Eq. 63}$$

where $m_v$ is the mass of the vehicle, $\eta_f$, $\eta_1$ and $\eta_c$ are the efficiency of the final drive 66, gear set 18, and CVT 14, respectively. $r_f$, $r_1$ and $r$ are the gear ratio of the final drive 66, gear set 18, and CVT 14, respectively. The equivalent mass excludes the factor of the flywheel's moment of inertia for the moment of inertia of the flywheel 12 is calculated separately in the dynamic equation of the flywheel 12, which is incorporated in the SESS 50. In the SESS 50, the flywheel 12 serves as an active energy storage unit via the control of the CVT 14; the energy dissipation due to aerodynamic drag and friction in the flywheel 12 chamber are taken into account during the calculation of the output torque of the SESS 50, as well as the dynamic effect of the flywheel 12.

The resulting force of the road loads is defined as:

$$F_{road}=0.5\cdot \rho \cdot C_D \cdot A_F \cdot V_{rel}^2 + m_v \cdot g \cdot (\cos\theta \cdot C_R + \sin\theta), \quad \text{Eq. 64}$$

where $\rho$, $C_D A_F$, $V_{rel}$, $g$, $C_R$, $\theta$ are the density of the air, aerodynamic drag coefficient, vehicle area normal to the direction of travel, gravitational constant, rolling resistance coefficient, and inclined angle of road.

The control strategies can be categorized as a rule-based control strategy, e.g. deterministic rule-based and fuzzy logic rule-based controls, and optimization based control strategy, e.g. equivalent consumption minimization, dynamic programming and genetic algorithm control strategy. In this section, Dynamic Programming (DP) is first implemented on the specific TESH powertrain to establish the global optimal as the baseline. The second control strategy used is the Heretically Designed Rule-Based (HDRB) control strategy. The goal of implementation of the HDRB control strategy is to reach an acceptable fuel economy result compared to the results generated by the DP. Then the Equivalent Consumption Minimization strategy (ECM) is derived via realization of Pontryagin's Minimum Principle (PMP). The development of these control strategies is shown in this section, and the tuning of the control parameters is implemented in the following sections.

Based on the control problem definition developed above for the TESH powertrain, the cost function J(u(t)) is defined as:

$$J(u(t)) = G(x(t_f)) + \int_{t_0}^{t_f} \dot{m}_f \, dt. \qquad \text{Eq. 65}$$

Discretization is necessary for the continuous-time model before solving for the minimum cost of J(u(t)) via DP. Eq. 61 is discretized as:

$$x_{k+1} = F_k(x_k, u_k), k = 0, 1, \ldots, N-1 \qquad \text{Eq. 66}$$

Letting $\pi = \{\mu_0, \mu_1, \ldots, \mu_{N-1},\}$ be the control policy, the cost function Eq. 61 is discretized as:

$$J_\pi(x_0) = g_N(x_N) + \emptyset_N(x_N) + \Sigma_{k=0}^{N-1} h_k(x_k, \mu_k(x_k)) + \emptyset_k(x_k), \qquad \text{Eq. 67}$$

where $J_\pi(x_0)$ is the cost of applying control policy $\mu$, $g_N(x_N)$ is the cost of the final time step, $\emptyset_N(x_N)$ is the penalty function of the final state, $\emptyset_k(x_k)$ is the penalty function at the time step k, and $h_k(x_k, \mu_k(x_k))$ is the cost of implementing control $\mu_k(x_k)$ at state $x_k$.

The term $\pi^0$ is defined as the optimal control policy that minimizes $J_\pi$:

$$J^o(x_o) = \min_{\pi \in \Pi} J_\pi(x_o). \qquad \text{Eq. 68}$$

According to Bellman's principle, the cost-to-go function $J_k(x^i)$ is evaluated at each time step. The cost-to-go function is defined as:

$$J_N(x^i) = g_N(x^i) + \emptyset_N(x^i). \qquad \text{Eq. 69}$$

The intermediate cost-to-go function is defined as:

$$J_k(x^i) = \min_{u_k \in U_k} \{h_k(x^i, u_k) + \phi_k(x^i) + J_{k+1}(F_x(x^i, u_k))\}. \qquad \text{Eq. 70}$$

The basic algorithm of Dynamic Programming is to calculate for the minimum cost-to-go function backward in time and output the $\pi^0$. The cost-to-go function $J_{k+1}(F_x(x^i, u_k))$ can be found via nearest-neighbor approximation or other advanced interpolation schemes. In the simulation of this section, linear interpolation is used to reduce the computational cost.

The definition of control inputs, i.e. u(t), and the definition of the state variables x(t) remain the same as defined in Eq. 43 and Eq. 44. The dynamic equations of the state variables, i.e. Eq. 53 and Eq. 54 can be rewritten as:

$$SOC_{k+1} = -\frac{P_{b,k} \cdot T_s}{E_{b,max} \eta_b^{sign(P_b(t))}} + SOC_k \qquad \text{Eq. 71}$$

$$r_{cvt,k+1} = \qquad \text{Eq. 72}$$
$$-\frac{\left[ T_l(r_{cvt,k}, t) \cdot r_{cvt,k} \cdot \omega_{cvt} + \frac{P_{sess,k} \cdot \eta_{cvt}^{sign(-P_{sess,k})}}{J_{fw} \cdot r_{cvt} \cdot \omega_{cvt}^2} + J_{fw} r_{cvt,k}^2 \cdot \omega_{cvt} \cdot \omega_{cvt} \right] \cdot T_s}{J_{fw} \cdot r_{cvt} \cdot \omega_{cvt}^2} + r_{cvt,k}$$

where $T_s$ is the time step that is set to be 1 second. In order to solve the optimization problem numerically, a generic dynamic programming Matlab function is used to simulate a chosen vehicle.

The Rule-Based Control strategies (RBC) won't guarantee a global optimal for the control problem. With carefully designed control laws and control parameters, RBC can generate acceptable results with significantly less computational burden compared to the DP strategy. For these reasons, RBC are widely used in commercialized hybrid vehicles. In general, the first step of designing an RBC for hybrid vehicle control is to identify the operation modes of the powertrain according to different combinations of the major component operating states. The second step is to create the control rules that dictate the transmissions among these modes by setting criteria such as SOC levels and shaft speed levels. The third step of the RBC design involves tuning the RBC in a simulated environment to generate desirable results. For a dual-energy source hybrid powertrain, this design process is intuitive and straight forward, the maximum number of operation modes for a dual-energy source hybrid powertrain, e.g. HEV, is 6. The modes include stop mode, pure engine mode, pure electric mode, hybrid mode, regenerative braking mode and charge sustaining mode. However, an RBC for the TESH powertrain uses as many as 18 modes to fully define all possible combinations of the three energy sources' operational states. Table 4 shows all the possible modes and the corresponding operation states of the ICE 20, EM 24, and SESS. In Table 4, +1, 0, −1 represent the positive torque, zero torque, and negative torque respectively, for ICE 20, EM 24, and SESS 50.

Figure 15:
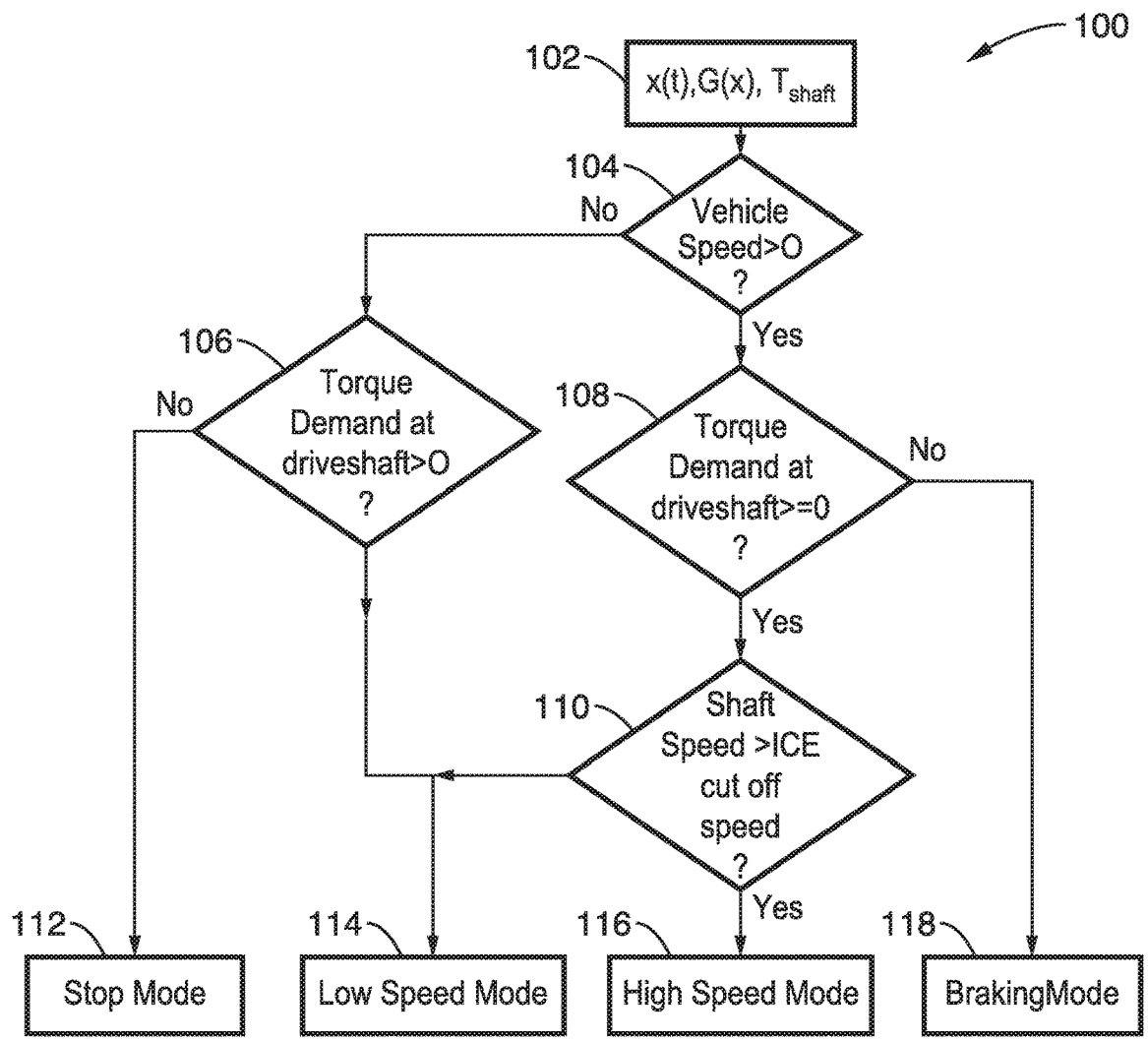
FIG. 15 is the flowchart of the high-level control process showing the operation modes in each of the high level modes.

Designing the criteria of transitions among each mode is very difficult, since there are 306 possible transitions among these modes. To simplify the design process and better determine the power split ratio among ICE 20, EM 24, and ESS 50, the RBC is designed with three levels of controls. The first level and highest level of control modes include: Stop Mode, Low Speed Mode, High Speed Mode, and Braking Mode. FIG. 15 is the flowchart of the high-level control 100 of RBC and Table 5 shows the operation modes in each of the high level modes.

Referring to FIG. 15, the stop mode 112 is for the vehicle at stop and the braking mode 118 is for the vehicle during braking, while the low speed 114 and high-speed 116 modes are for propulsion. Input data 102 (e.g. states of the system x(t), auxiliary function G(x), shaft torque demand $T_{shaft}$) is evaluated and at box 104. If vehicle speed is not >0, the torque demand at the driveshaft is evaluated at box 106. If the torque demand at the driveshaft is not >0, stop mode 112 is applied. If the torque demand at the driveshaft is >0, low speed mode 114 is applied. At evaluation box 104, if vehicle speed is >0, the torque demand at the driveshaft is evaluated at box 108. If the torque demand at the driveshaft is not ≥0, breaking mode 118 is applied. If the torque demand at the driveshaft is ≥0, shaft speed is compared with ICE cut-off speed at evaluation box 110. If the shaft speed is >the ICE cut-off speed, the high speed mode 116 is applied. If the shaft speed is not >the ICE cut-off speed, the low speed mode 114 is applied.

The ICE 20 is shut off in the low-speed mode 114 due to the low efficiency of the ICE 20 at low speeds. The threshold value of the engine speed that decides whether the engine is turned-off is denoted as the engine cut-off speed. This engine cut-off speed may be used as a design parameter for further tuning in simulation to generate better fuel economy. In stop mode 112, the ICE 20, EM 24, and SESS 50 are all shut off, but the other three high-level modes comprise of multiple operation modes. In Table 5, there are five modes in Low-Speed Mode and Braking mode. There 20 possible transitions among modes in either Low-Speed Mode or Braking mode. It is challenging to design a High-Speed Mode that has 14 operation modes and 182 possible transitions. To simplify the design process, the medium level control modes are created according to the torque demands at shaft.

Figure 16A:
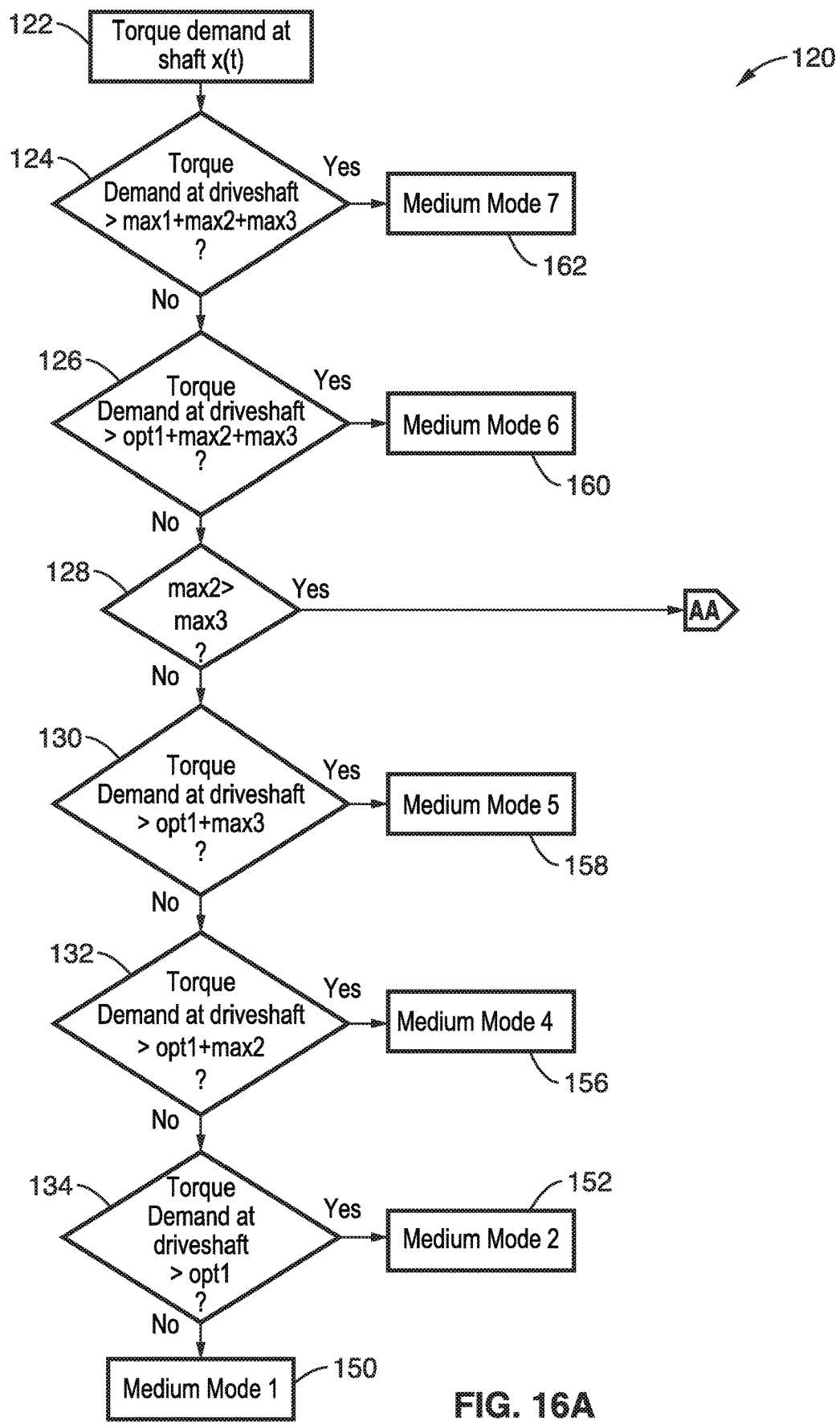
FIG. 16A and FIG. 16B show a general schematic diagram of a high-level control mode that has medium levels control modes and the criteria for transitions.
Figure 16B:
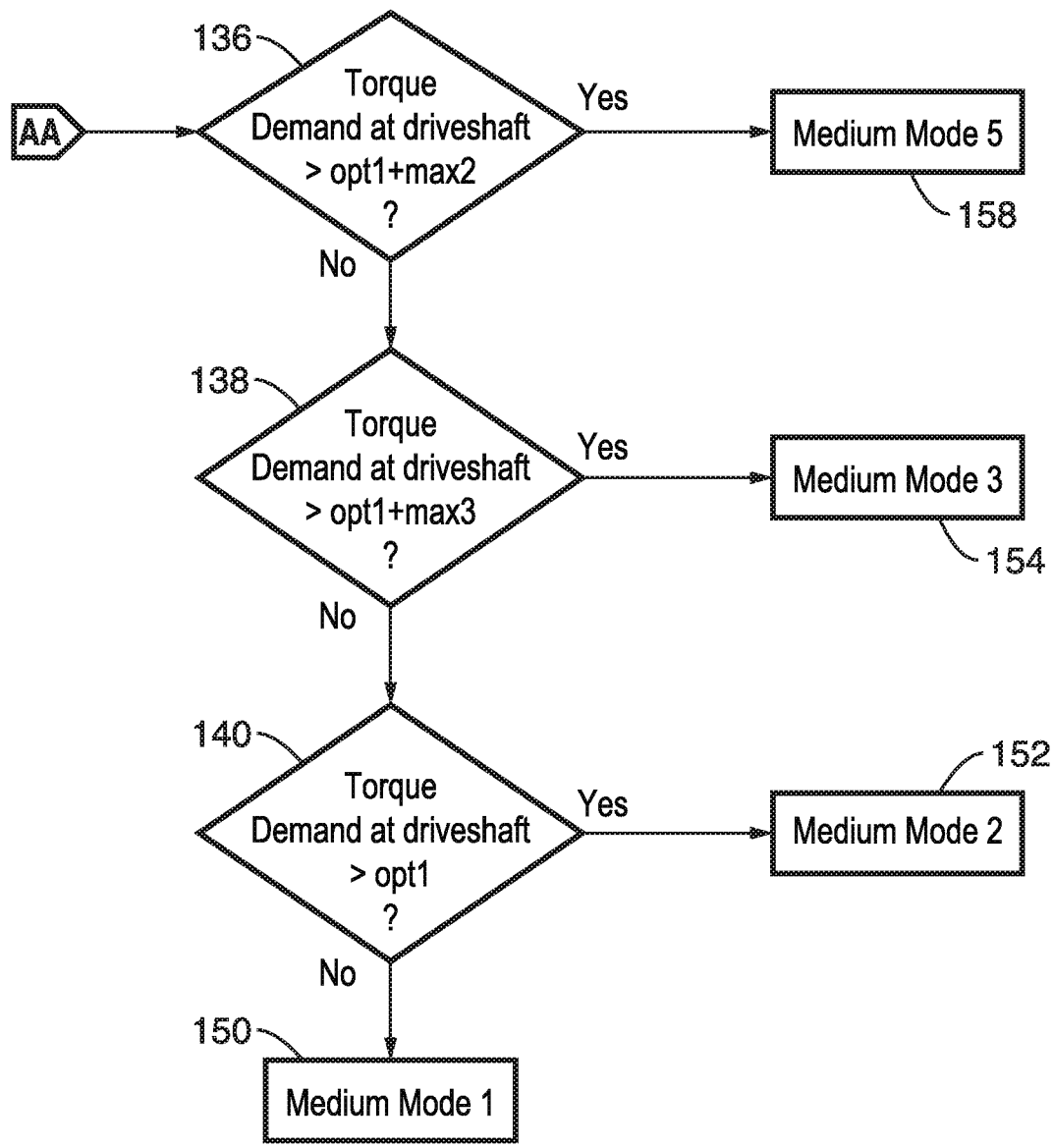

FIG. 16A and FIG. 16B show a general schematic diagram of a high-level control mode 120 that has medium levels control modes and the criteria for transitions. The torque demand at the driveshaft is input at block 122, and evaluated at decision blocks 124 through 140 for specified criteria within each block (e.g. opt1, max1, max2, max3, as compared to shaft torque demand). Results at each decision block 124 through 140 determine the appropriate medium mode 150 through 167 (Medium Mode 1 through Medium Mode 7).

To avoid a complicated web-like structure of transitions among each operation mode the operation modes were grouped into medium level modes in FIG. 16A and FIG. 16B. While FIG. 16A and FIG. 16B show the medium level flow chart of the high speed mode, this type of tree-shaped control algorithm may be used for the transmissions among the five operation modes in low-speed propulsion mode. However, in the high speed mode, the total number of possible transitions among all 14 operation modes is 182. These medium level modes greatly reduced the complexity of the control algorithm.

Table 6 shows the threshold values for the various criteria used in FIGS. 16A and 16B. In Table 6, opt1, max1, max2, and max3 are threshold values for torque supplies from ICE 20, EM 24, and SESS 50. The values of these thresholds can be tuned according to the goals of optimization. Table 6 shows two possible sets of threshold values. In Table 6, $T_{e,opt}$ is the possible torque supplied by the engine at the instance with maximum fuel efficiency; $T_{e,max}$ is the maximum torque supplied by the engine at the instance; $T_{m,opt}$ is the possible torque supplied by the EM 24 at the instance with maximum fuel efficiency; $T_{m,max}$ is the maximum torque supplied by the EM 24 at the instance; and $T_{sess,max}$ is the maximum torque supplied by the SESS 50 at the instance. Threshold value set 1 focuses on operating the engine at high efficiency while threshold value set 2 also allows EM 24 to operate at high efficiency.

In the medium level modes, the criteria for activating the operational modes is the state of charge of the battery 26 and the gear ratio of the CVT 14. In general, energy in SESS 50 is frequently used compared to the energy in battery 26, e.g. SESS 50 provides maximum power output and recapture. The CVT 14 has physical limits for its gear ratio while the high and low boundaries of battery SOC need to be set to prevent damaging the battery 26. Although CVT 14 has a physical minimum gear ratio and maximum ratio, soft limits are also needed to reserve a small amount of the capacity of the SESS 50.

Compared to the Dynamic Programming Strategy, which requires prior knowledge of the of the drive cycle and a considerable amount of computational power, the Equivalent Consumption Minimization Strategy (ECM) can be implemented in real-time without prior knowledge of the drive cycle. While the effort to design and to tune the RBC controller is significant, the design of the of ECM controller is fairly straightforward and there are only two pairs of control parameters need to be tuned in ECM. These two pairs of control parameters are equivalent factors of the electrical energy from the SES 74 and equivalent factors of the energy from the SESS 50.

To derive the ECM for TESH powertrain, Pontrayagin's Minimum Principle (PMP) is implemented. With the general formation, the necessary conditions for optimal control trajectory u*(t) can be found. The general formation of this optimization problem changes according to the constraints of the state variables. With available formations and the general control problem definition specified above, the PMP can be applied with the constraint set G(x,u,t) in the following forms:

$$u(t) = [u_1(t), u_2(t)]^T = [P_b(t), P_{sess}(t)]^T, \quad \text{Eq. 73}$$

$$x(t) = [x_1(t), x_2(t)]^T = [SOC(t), r_{cvt}(t)]^T, \quad \text{Eq. 74}$$

$$\dot{x}(t) = \begin{cases} -\dfrac{P_b(t)}{E_{b,max} \cdot \eta_b^{sign(P_b(t))}} = f_1(x_1, u_1) \\ -\dfrac{\left[T_l(r_{cvt}, t) \cdot r_{cvt} \cdot \omega_{cvt} + P_{sess} \cdot \eta_{cvt}^{sign(-P_{sess})} + J_{fw} \cdot r_{cvt}^2 \cdot \omega_{cvt} \cdot \dot{\omega}_{cvt}\right]}{J_{fw} \cdot r_{cvt} \cdot \omega_{cvt}^2} = f_2(x_2, u_2) \end{cases} \quad \text{Eq. 75}$$

Assuming that three subsets A, B, C∈[$t_0$, $t_f$] exist, these 3 subsets satisfy:
1) only one state constraint is active, and it is for state variable $x_1$, ∀t∈A;
2) only one state constraint is active, and it is for state variable $x_2$, ∀t∈B;
3) two state constraints are active, and one of them is for state variable $x_1$ and one of them is for state variable $x_2$, ∀t∈C.

To incorporate the constraints into the PMP, G(x,u,t) we need to take the time derivatives to the order of n so that in $G^{(n)}$ (x,u,t), $u_1$ (t), $u_2$ (t) are explicitly shown for the first time. From Eq. 75, the order n is clearly 1:

$$G^{(1)}(x, u, t) = \begin{cases} G^{(1)}_{1,max}(x_1, u_1) = f_1(x_1, u_1) \\ G^{(1)}_{1,min}(x_1, u_1) = -f_1(x_1, u_1) \\ G^{(2)}_{2,max}(x_2, u_2) = f_2(x_2, u_2) \\ G^{(2)}_{2,min}(x_2, u_2) = -f_2(x_2, u_2) \end{cases} \quad \text{Eq. 76}$$

The Hamiltonian function of the system can be written as:

$$H(x, u, t) = \begin{cases} \dot{m}_f(t, u) + \lambda_1 \cdot f_1(x_1, u_1) + & t \in A \\ \quad \lambda_2 \cdot f_2(x_2, u_2) + \\ \quad \mu_{1,1} \cdot f_1(x_1, u_1) \\ \dot{m}_f(t, u) + \lambda_1 \cdot f_1(x_1, u_1) + \lambda_2 \cdot & t \in B \\ \quad f_2(x_2, u_2) + \\ \quad \mu_{1,2} \cdot f_2(x_2, u_2) \\ \dot{m}_f(t, u) + \lambda_1 \cdot f_1(x_1, u_1) + \lambda_2 \cdot & t \in C \\ \quad f_2(x_2, u_2) + \\ \quad \mu_{1,3} \cdot f_1(x_1, u_1) + \mu_{1,4} \cdot f_2(x_2, u_2) \\ \dot{m}_f(t, u) + \lambda_1 \cdot f_1(x_1, u_1) + & t \notin (A \cup B \cup C) \\ \quad \lambda_2 \cdot f_2(x_2, u_2) \end{cases} \quad \text{Eq. 77}$$

where $\lambda_1$ and $\lambda_2$ are co-states. According to PMP, $\mu_1$ exists and it is greater or equal to zero while the constraints of the state are active. Although PMP states that $\mu_{1,1}, \mu_{1,2}, \mu_{1,3}$, and $\mu_{1,4}$ are unknown, they can be found by trial-and-error.

From Theorem I, the optimal control trajectory $u^o(t)$ and the optimal state trajectory $x^o(t)$ satisfy the following conditions for $t \in [t_0, t_f]$:

1) the Hamiltonian function $H(x,u,t)$ is minimized by the optimal control $u^o(t)$ for $t \in [t_0, t_f]$;
2) $f_1(x_1^o, u_1^o) = 0$, and $f_2(x_2^o, u_2^o) \neq 0$. $\forall t \in A$;
3) $f_1(x_1^o, u_1^o) \neq 0$, and $f_2(x_2^o, u_2^o) = 0$. $\forall t \in B$;
4) $f_1(x_1^o, u_1^o) = 0$, and $f_2(x_2^o, u_2^o) = 0$. $\forall t \in C$;
5) $f_1(x_1^o, u_1^o) \neq 0$, and $f_2(x_2^o, u_2^o) \neq 0$. $\forall t \notin (A \cup B \cup C)$;
6) The terminal conditions satisfy $x^o(t_0) = x_0$ and $x^o(t_f) = x_0$;
7) If $\lambda_1^o$ and $\lambda_2^o$ are the optimal co-states trajectory, they satisfy the following dynamic equations:

$$\begin{cases} \dot{\lambda}^o(t) = -\nabla_x H^o = -\frac{\partial \dot{m}_f(t,u)}{\partial x} - \lambda^o(t)^T \cdot \frac{\partial f(x^o, u^o)}{\partial x} & \text{for } t \notin (A \cup B \cup C) \\ \dot{\lambda}^o(t) = -\nabla_x H^o = -\frac{\partial \dot{m}_f(t,u)}{\partial x} - \lambda^o(t)^T \cdot \frac{\partial f(x^o, u^o)}{\partial x} - \mu_{1,1} \cdot \nabla_x f_1(x_1, u_1) & \text{for } t \in A \\ \dot{\lambda}^o(t) = -\nabla_x H^o = -\frac{\partial \dot{m}_f(t,u)}{\partial x} - \lambda^o(t)^T \cdot \frac{\partial f(x^o, u^o)}{\partial x} - \mu_{1,2} \cdot \nabla_x f_2(x_2, u_2) & \text{for } t \in B \\ \dot{\lambda}^o(t) = -\nabla_x H^o = -\frac{\partial \dot{m}_f(t,u)}{\partial x} - \lambda^o(t)^T \cdot \frac{\partial f(x^o, u^o)}{\partial x} \\ \quad - \mu_{1,3} \cdot \nabla_x f_1(x_1, u_1) - \mu_{1,4} \cdot \nabla_x f_2(x_2, u_2) & \text{for } t \in C. \end{cases} \quad \text{Eq. 78}$$

$\mu_{1,1}, \mu_{1,2}, \mu_{1,3}$, and $\mu_{1,4}$ can be replaced by the same parameter $\mu_1$ as long as it is big enough since the results are not sensitive to it. From Eq. 75, $$\frac{\partial f_1(x_1, u_1)}{\partial x_1} \text{ and } \frac{\partial f_2(x_2, u_2)}{\partial x_2}$$

can be written a:

$$\frac{\partial f_1(x_1, u_1)}{\partial x_1} = \frac{\text{sign}(u_1) \cdot u_1}{E_{b,max} \cdot \eta_b^{\text{sign}(u_1)+1}} \cdot \frac{\partial \eta_b}{\partial x_1} \quad \text{Eq. 79}$$

$$\frac{\partial f_2(x_2, u_2)}{\partial x_2} = \left[ \frac{u_2 \cdot \eta_{cvt}^{\text{sign}(-u_2)} + \text{sign}(u_2) \cdot u_2 \cdot x_2 \cdot \eta_{cvt}^{-1-\text{sign}(u_2)} \frac{\partial \eta_{cvt}}{\partial x_2}}{J_{fw} \cdot \omega_{cvt} \cdot x_2^2} - \frac{1.8 \cdot \alpha_1 \cdot \omega_{cvt}^{0.8} \cdot x_2^{0.8}}{J_{fw}} - \frac{\dot{\omega}_{cvt}}{\omega_{cvt}} \right]. \quad \text{Eq. 80}$$

$\dot{m}_f(t,u)$ is not an explicit function of x, so the condition 7 for $\dot{\lambda}^o(t) = [\dot{\lambda}_1^o(t), \dot{\lambda}_2^o(t),]$ can be rewritten with substitution from Eq. 79 and Eq. 80:

$$\dot{\lambda}_1^o(t) = \begin{cases} -\frac{\text{sign}(u_1) \cdot \lambda_1^o \cdot u_1}{E_{b,max} \cdot \eta_b^{\text{sign}(u_1)+1}} \cdot \frac{\partial \eta_b}{\partial x_1} & \text{for } t \notin (A \cup C) \\ -\frac{\text{sign}(u_1) \cdot (\lambda_1^o \pm \mu_1) \cdot u_1}{E_{b,max} \cdot \eta_b^{\text{sign}(u_1)+1}} \cdot \frac{\partial \eta_b}{\partial x_1} & \text{for } t \in (A \cup C) \end{cases} \quad \text{Eq. 81}$$

$$\dot{\lambda}_2^o(t) = \begin{cases} -\left[ \frac{u_2 \eta_{cvt}^{\text{sign}(-u_2)} + \text{sign}(u_2) \cdot u_2 \cdot x_2 \cdot \eta_{cvt}^{-1-\text{sign}(u_2)} \frac{\partial \eta_{cvt}}{\partial x_2}}{J_{fw} \cdot \omega_{cvt} \cdot x_2^2} - \frac{1.8 \cdot \alpha_1 \cdot \omega_{cvt}^{0.8} \cdot x_2^{0.8}}{J_{fw}} - \frac{\dot{\omega}_{cvt}}{\omega_{cvt}} \right] \cdot \lambda_2^o & \text{for } t \notin (B \cup C) \\ -\left[ \frac{u_2 \eta_{cvt}^{\text{sign}(-u_2)} + \text{sign}(u_2) \cdot u_2 \cdot x_2 \cdot \eta_{cvt}^{-1-\text{sign}(u_2)} \frac{\partial \eta_{cvt}}{\partial x_2}}{J_{fw} \cdot \omega_{cvt} \cdot x_2^2} - \frac{1.8 \cdot \alpha_1 \cdot \omega_{cvt}^{0.8} \cdot x_2^{0.8}}{J_{fw}} - \frac{\dot{\omega}_{cvt}}{\omega_{cvt}} \right] \cdot (\lambda_2^o \pm \mu_1 \mu_1) & \text{for } t \in (B \cup C) \end{cases} \quad \text{Eq. 82}$$

To make the Hamiltonian function more compact, the following auxiliary functions $p(x_1)$ and $q(x_2)$ are used:

$$p(x_1) = \begin{cases} \mu_1 & \text{if } G_{1,max} \geq 0 \\ -\mu_1 & \text{if } G_{1,min} \geq 0 \\ 0 & \text{if } G_{1,max} < 0 \text{ and } G_{1,max} < 0 \end{cases} \qquad \text{Eq. 83}$$

$$q(x_2) = \begin{cases} \mu_1 & \text{if } G_{2,max} \geq 0 \\ -\mu_1 & \text{if } G_{2,min} \geq 0 \\ 0 & \text{if } G_{2,max} < 0 \text{ and } G_{2,max} < 0 \end{cases} \qquad \text{Eq. 84}$$

Eq. 83 and Eq. 84 are then substituted into the Hamiltonian function, which when minimized becomes:

$$H(x,u,t) = \dot{m}_f(t,u) - (\lambda_1 + p(x_1)) \cdot \left( \frac{u_1}{E_{b,max} \cdot \eta_b^{sign(u_1)}} \right) - \qquad \text{Eq. 85}$$

$$(\lambda_2 + q(x_2)) \cdot \left( \frac{[T_1(r_{cvt},t) \cdot r_{cvt} \cdot \omega_{cvt} + u_2 \cdot \eta_{cvt}^{sign(-u_2)} + J_{fw} \cdot r_{cvt}^2 \cdot \omega_{cvt} \cdot \dot{\omega}_{cvt}]}{J_{fw} \cdot r_{cvt} \cdot \omega_{cvt}^2} \right).$$

PMP transforms the optimization problem of the cost function over a certain time span into an instantaneous minimization of the Hamiltonian. The Equivalent Consumption Minimization Strategy requires more transformation of the Hamiltonian to reach a more intuitive expression for instant minimization. The first step of the transformation is to create a reduced Hamiltonian $\overline{H}$:

$$\overline{H}(x,u,t) = \dot{m}_f(t,u) - (\lambda_1 + p(x_1)) \cdot \frac{u_1}{E_{b,max} \cdot \eta_b^{sign(u_1)}} - \qquad \text{Eq. 86}$$

$$(\lambda_2 + q(x_2)) \cdot \frac{u_2}{J_{fw} \cdot r_{cvt} \cdot \omega_{cvt}^2 \cdot \eta_{cvt}^{sign(u_2)}}.$$

The instantaneous minimization of the $\overline{H}$ over the control input $u(t)$ is equivalent to the minimization of the H since the reduced terms that represent the power lost in the SESS 50 due to friction is not a function of the any control input. The factors $s_1$ and $s_2$ are defined as follows:

$$S_1 = -\frac{Q_{lhv}}{\eta_b^{sign(u_1)} \cdot E_{b,max}} \cdot \lambda_1, \qquad \text{Eq. 87}$$

$$S_2 = -\frac{Q_{lhv}}{\eta_{cvt}^{sign(u_2)} \cdot J_{fw} \cdot r_{cvt} \cdot \omega_{cvt}^2} \cdot \lambda_2. \qquad \text{Eq. 88}$$

Substituting Eq. 87 and Eq. 88 into Eq. 86 yields:

$$\overline{H}(x,u,t) = \qquad \text{Eq. 89}$$

$$\dot{m}_f(t,u) + s_1 \cdot \left(1 + \frac{p(x_1)}{\lambda_1}\right) \cdot \frac{u_1}{Q_{lhv}} + s_2 \cdot \left(1 + \frac{q(x_2)}{\lambda_2}\right) \cdot \frac{u_2}{Q_{lhv}},$$

where $\left(1 + \frac{p(x_1)}{\lambda_1}\right)$ and $\left(1 + \frac{q(x_2)}{\lambda_2}\right)$ are penalty functions that are not 1 only when the state constraint is active. $Q_{lhv}$ is the lower heating value of the fuel and the control inputs are power demands, so that $$\frac{u_i}{Q_{lhv}}$$

can be considered as fuel mass flow rate. The definition of the equivalent fuel mass flow rates for SES and SESS are shown as following:

$$\dot{m}_{electric} = s_1 \cdot \left(1 + \frac{p(x_1)}{\lambda_1}\right) \cdot \frac{u_1}{Q_{lhv}}, \qquad \text{Eq. 90}$$

$$\dot{m}_{sess} = s_2 \cdot \left(1 + \frac{q(x_2)}{\lambda_2}\right) \cdot \frac{u_2}{Q_{lhv}}. \qquad \text{Eq. 91}$$

The Hamiltonian of the function, instantaneous minimization object, can now be considered as the equivalent fuel mass flow rate of the entire TESH powertrain $\dot{m}_{eqv}$:

$$\overline{H}(x,u,t) = \dot{m}_f + \dot{m}_{electric} + \dot{m}_{sess} = \dot{m}_{eqv} \qquad \text{Eq. 92}$$

The backward facing simulation model of the TESH powertrain was created in Matlab Simulink based on the quasi-static model shown in FIG. 14. The specifications of the vehicle, diesel engine, EM 24 and battery 26 module specifications are chosen from the ADVISOR database.

The first implemented control strategy here is the Dynamic Programming strategy. Although DP guarantees a global optimal, it is not a suitable candidate for real-time because of its computationally intense process. DP is implemented purely to provide a baseline result for comparison with the other two control strategies. The fuel economy generated by DP is 16.4 miles per gallon.

Compared to the DP strategy, the rule-based design control strategy can be implemented in real time. However, it does not provide a global optimal. Despite the tuning and modification of the RCS, the best fuel economy of this drive cycle is 13.54 miles per gallon.

To implement the ECM, parameters for the controller were set before the simulation. In Eq. 90 and Eq. 91, the terms that define the penalty for crossing the boundaries of the states are $$\frac{p(x_1)}{\lambda_1} \text{ and } \frac{q(x_2)}{\lambda_2}.$$

The magnitude of these two terms is set to be 100. Since the outcome of the simulation is not sensitive to these two terms, no tuning is needed for them.

There are four terms that need tuning to reach the optimal fuel economy. The four terms are $s_{1,ch}$, i.e. equivalent charging factor for battery 26,$\eta_{b,avg}$, i.e. average battery efficiency, $s_{2,ch}$, i.e. equivalent charging factor for SESS 50, and $\eta_{cvt,avg}$ i.e. average CVT 14 efficiency. With these four terms and the two penalty terms, Eq. 90 and Eq. 91 can be rewritten as:

$$\dot{m}_{electric} = \begin{cases} s_{1,ch} \cdot \left(1 + \frac{p(x_1)}{\lambda_1}\right) \cdot \frac{u_1}{Q_{lhv}} & \text{for } u_1 \geq 0 \\ s_{1,ch} \cdot \left(1 + \frac{p(x_1)}{\lambda_1}\right) \cdot \frac{u_1}{Q_{lhv} \cdot \eta_{b,avg}^2} & \text{for } u_1 < 0 \end{cases} \qquad \text{Eq. 93}$$

$$\dot{m}_{sess} = \begin{cases} s_{2,ch} \cdot \left(1 + \frac{q(x_2)}{\lambda_2}\right) \cdot \frac{u_2}{Q_{lhv}} & \text{for } u_2 \geq 0 \\ s_{2,ch} \cdot \left(1 + \frac{q(x_2)}{\lambda_2}\right) \cdot \frac{u_2}{Q_{lhv} \cdot \eta_{cvt,avg}^2} & \text{for } u_2 < 0 \end{cases} \qquad \text{Eq. 94}$$

Two equivalent charging factors and two average efficiencies are chosen as tuning parameters because they all have physical meaning to help identify the range of tuning. For an equivalent charging factor, the tuning range is from 1 to 4 since it represents the factor for charging the energy storage system with ICE 20. For an average efficiency, the tuning range is from 50% to 100%. After a simulation with the possible combination of the parameters within the tuning ranges, the optimal fuel economy is reached at $s_{1,ch,opt}=\eta_{b,avg,opt}=95\%$, $S_{2,ch,opt}=2.5$, $\eta_{b,avg,opt}=80\%$, and the fuel economy is 17.3 MPG.

An important result is that the fuel economy of the ECM simulation is 17.3 miles per gallon while it is 19.4 miles per gallon from DP simulation and it is only 13.54 miles per gallon from RBC simulation.

The fuel economy result of the ECM simulation is unexpected since the DP is supposed to provide the global optimal that is the greatest fuel economy. However, it is worth noticing that the final SOC of the DP simulation is within a 0.5% range of the initial SOC while the battery 26 in the ECM simulation decreases by 4.5%. This considerable amount of battery 26 discharge is the reason that fuel economy from the ECM simulation is larger than the global optimal provided by DP. The change in SOC over the duration of the simulation is defined as shown in Eq. 95:

$$\Delta SOC = SOC_f - SOC_{ini}. \quad \text{Eq. 95}$$

where $SOC_f$ is the final SOC and $SOC_{ini}$ is the initial SOC. To evaluate the fuel consumption including this phenomenon; an augmented fuel consumption, $m_{f,aug}$, is defined similar to the equivalent fuel mass flow defined in Eq. 92:

$$m_{f,aug} = m_f + m_{electric} \quad \text{Eq. 96}$$

where $m_f$ is the ICE's fuel consumption and $m_{electric}$ is the equivalent fuel consumption due to the SOC change over the duration of the simulation. $m_{electric}$ is defined in Eq. 97:

$$m_{electric} = \frac{s_{1,ch,opt} \cdot \eta_{b,avg,opt}^{sign(\Delta SOC)} \cdot (-\Delta SOC) \cdot E_{b,max}}{Q_{lhv}}. \quad \text{Eq. 97}$$

With the definition above, the augmented fuel consumption of the ECM simulation is smaller than the fuel consumption of the ICE 20, hence resulting in an augmented fuel economy at 15.6 miles per gallon. Since the SOC change in the DP simulation is not significant enough, the power augmented fuel economy for DP remains at 16.4 miles per gallon. After implementation of this augmentation, the augmented fuel economy of the RBC simulation is 14.8 miles per gallon.

To further study the simulation results of this type of powertrain with the three control strategies discussed above, simulations using vehicles with the same vehicle specifications but with different powertrains for the UDDS drive cycles were implemented in ADVISOR.

Figure 17:
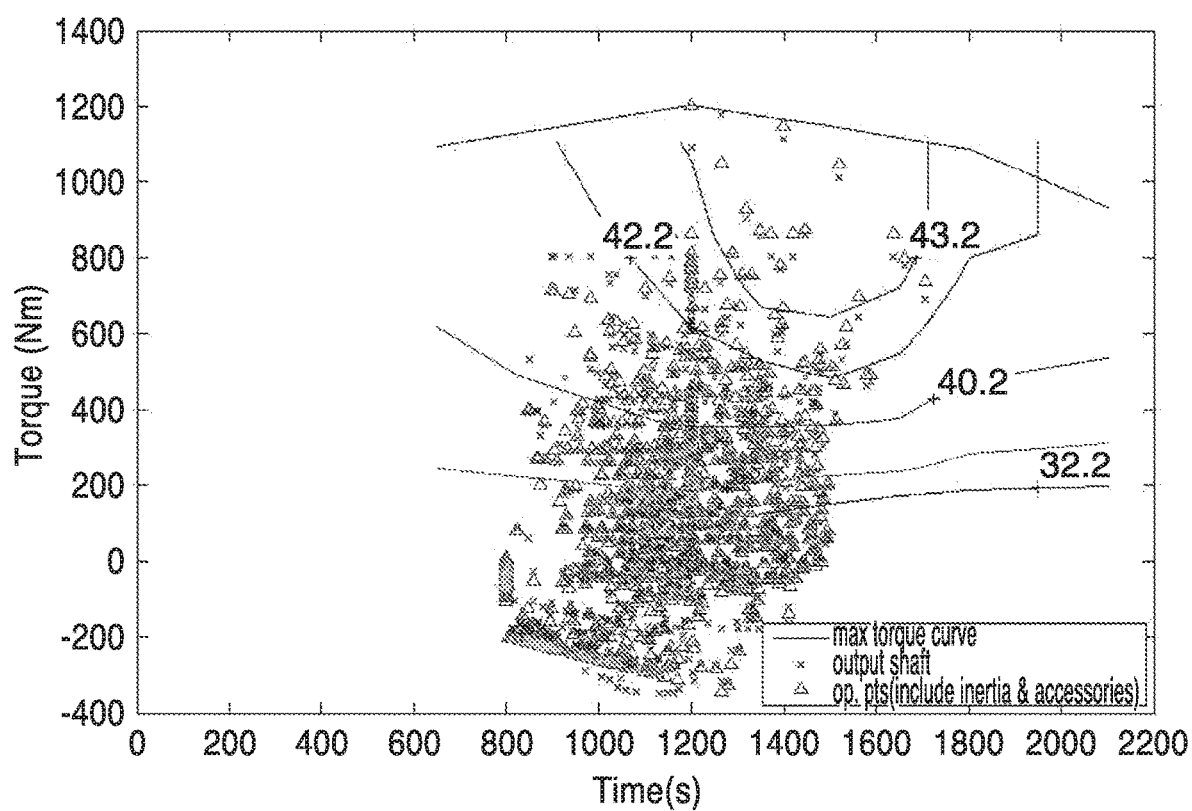
FIG. 17 shows a plot of the results of the simulation for a conventional vehicle equipped with a manual transmission and the same ICE as in the TESH powertrain.

FIG. 17 shows a plot of the results of the simulation for a conventional vehicle equipped with a manual transmission and the same ICE 20 as in the TESH powertrain. The built-in powertrain control of the manual transmission powertrain obviously missed the high efficiency operating region and the fuel economy of this conventional powertrain was 9.2 MPG.

Figure 18:
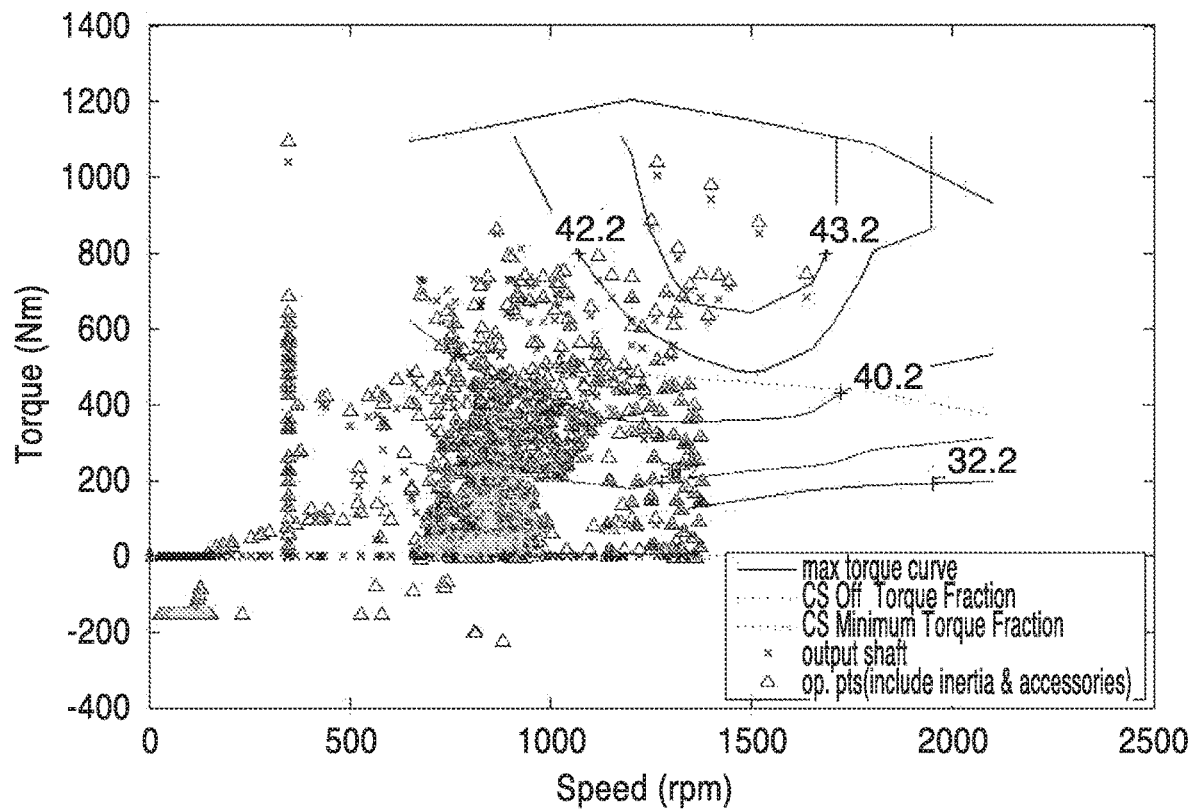
FIG. 18 shows a plot of the results of the simulation for a parallel hybrid electric vehicle equipped with the same ICE and the same EM as the TESH powertrain.

FIG. 18 shows a plot of the results of the simulation for a parallel hybrid electric vehicle equipped with the same ICE 20 and the same EM 24 as the TESH. From FIG. 18, it is clear that the ICE 20 shuts down very often for the vehicle to run at pure electric mode and the operation points still concentrate in the low efficiency region. The fuel economy of this parallel hybrid electric powertrain for UDDS drive cycle is 14 MPG.

Compared to the conventional powertrain and the parallel hybrid power, the TESH powertrain's operation actually allows the ICE 20 to operate more often at the high efficiency region and provide a better fuel economy than the control strategies implemented by ADVISOR.

In conclusion, DP, RBC and ECM are implemented on the TESH powertrain model that was developed in the previous chapter. The simulation results of DP, RBC and ECM control strategies implemented on the TESH powertrain model can be summarized as following:

The RBC method takes a significant amount of time to design, debug and tune due to the 18 possible modes of the TESH powertrain, but the controller can be implemented in real time.

The DP method takes around 42 minutes to generate the global optimal with a properly chosen grid, while tuning to obtain the proper grid takes hours of trial and error effort. Since the information of the drive cycle is known a prior, the DP controller cannot be implemented in real time.

The ECM controller can be implemented in real time. However, to reach a fuel economy that is close to the global optimal, there are four control parameters that need to be tuned by trial and error. The tuning process will take hours or even days without a proper tuning range.

By implementing the equivalent fuel consumption method to evaluate not only the fossil fuel consumption but also the electricity usage, the augmented fuel economy of the TESH powertrain in UDDS drive cycle is 14.8 MPG, 15.6 MPG, and 16.4 MPG for RBC, ECM, and DP respectively.

All the components in all three simulations operate within the design limits. The powertrain performs properly over the UDDS drive cycle meeting the performance requirement.

Further simulation tool and control strategies may include: 1) refinement of the RBC for a better fuel economy, 1) modifying the ECM with adaptive control parameters that are automatically tuned during the drive cycle to increase the robustness of the system, 3) simulate different drive cycles to test the capability of the control strategies and the powertrain. For example, highway drive cycles can be simulated to test the fuel economy of the TESH for long haul situations.

It can be understood from the results that the potentials of some of the components are not fully realized in the chosen powertrain. For example both the ICE 20 and the EM 24 are capable of running at speed higher than the highest speed of the UDDS drive cycle. Different powertrain topologies and different component sizes maybe implemented to find the optimal powertrain configuration for different drive cycles.

Table 1 and Table 2 present embodiments of computer programming instructions for implementing the methods technology described herein.

Figure 19:
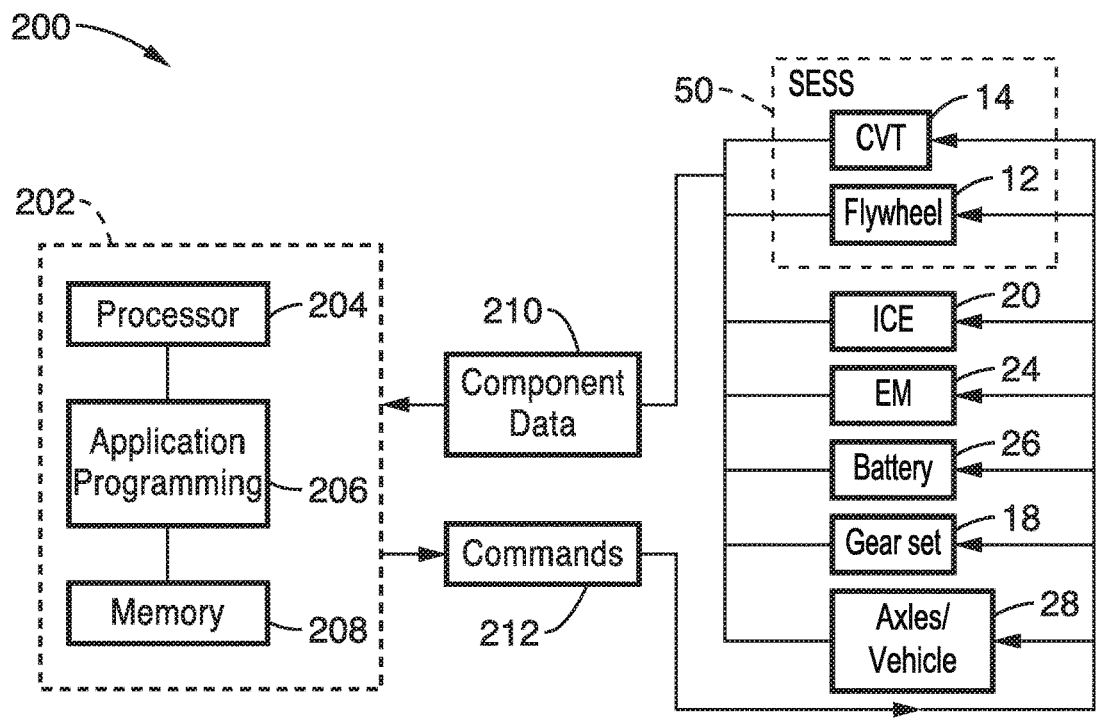
FIG. 19 shows a schematic diagram of a Tri-Energy Source Hybrid (TESH) system in accordance with the present description.

FIG. 19 shows a schematic diagram of a Tri-Energy Source Hybrid (TESH) system 200 in accordance with the present description. TESH system 200 may comprise any of the TESH powertrain configurations 10a through 10e shown in FIG. 1 through FIG. 5. TESH system 200 includes a controller/computing device 202 that includes application programming 206 that may include code, as provided in Table 1 or Table 2, or other instructions for implemented any of the methods detailed above, the instructions being stored in memory 208 and executable on processor 204. Application programming 206 may also comprise instructions for receiving component data 210 (e.g. torque and velocity values, etc.) and providing commands 212 for controlling one or more components (e.g. flywheel 12, CVT 14, SESS 50, ICE 20, EM 24, battery 26, gear set 18 and axles/vehicle 28). In one embodiment, the controller 202 receives data from and controls operation of flywheel 12 and CVT 14 for interoperation with the ICE 20 and EM 24 and battery 26 the programming further configured for splitting power among multiple energy sources, e.g. ICE 20, EM 24 and SESS 50 to control load leveling and power surges for optimizing vehicle operating efficiency.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A hybrid vehicle powertrain apparatus, comprising: a short-term energy storage system (SESS) comprising a flywheel and continuously variable transmission (CVT); an internal combustion engine (ICE) coupled to the SESS; an electric motor (EM) coupled to the SESS; and a controller coupled to the SESS, ICE and EM; wherein the controller is configured for controlling said flywheel and CVT for interoperation with the ICE and EM; and wherein said controller is further configured for splitting power among one or more of the SESS, ICE and EM.

2. The apparatus of any preceding embodiment, wherein the controller is further configured to control one or more of load leveling and power surges of one or more of the SESS, ICE and EM to optimize vehicle operating efficiency.

3. The apparatus of any preceding embodiment, wherein the controller is further configured to control one or more of said flywheel and CVT of said SESS to provide an energy buffer to level a peak load of a hybrid electric powertrain comprising the SESS, ICE and EM.

4. The apparatus of any preceding embodiment: wherein the SESS is coupled to a drive shaft of a power-split hybrid electric powertrain; and wherein the SESS is configured to store energy to power the powertrain.

5. The apparatus of any preceding embodiment, wherein the flywheel and CVT are coupled a driveshaft that is output from the EM.

6. The apparatus of any preceding embodiment, wherein an input of the EM is coupled to an output shaft of the ICE.

7. The apparatus of any preceding embodiment, wherein an input shaft of the flywheel is coupled to an output shaft of the ICE.

8. The apparatus of any preceding embodiment, wherein the flywheel and CVT are coupled the output EM driveshaft through a gear set.

9. The apparatus of any preceding embodiment, wherein the flywheel and CVT are coupled a driveshaft that is output from the ICE.

10. The apparatus of any preceding embodiment, wherein an input shaft of the flywheel is coupled to an output shaft of the EM.

11. The apparatus of any preceding embodiment, wherein the flywheel I coupled to an output and input of the CVT via a planetary gear.

12. The apparatus of any preceding embodiment, wherein the CVT is disposed between an input and an output of the EM and ICE.

13. A hybrid vehicle powertrain apparatus, comprising: (a) a short-term energy storage system (SESS) comprising a flywheel and continuously variable transmission (CVT); (b) an internal combustion engine (ICE) coupled to the SESS; (c) an electric motor (EM) coupled to the SESS; and (d) a processor coupled to the SESS, ICE and EM; and (e) a non-transitory memory storing instructions executable by the processor; (d) wherein said instructions, when executed by the processor, perform steps comprising: (i) receiving data from one or more of the SESS, ICE and EM for controlling said flywheel and CVT for interoperation with the ICE and EM; and (ii) splitting power among one or more of the SESS, ICE and EM.

14. The apparatus of any preceding embodiment, wherein the instructions when executed by the processor further perform the steps comprising: (iii) controlling one or more of load leveling and power surges of one or more of the SESS, ICE and EM to optimize vehicle operating efficiency.

15. The apparatus of any preceding embodiment, wherein the instructions when executed by the processor further perform the steps comprising: (iii) controlling one or more of said flywheel and CVT of said SESS to provide an energy buffer to level a peak load of a hybrid electric powertrain comprising the SESS, ICE and EM.

16. The apparatus of any preceding embodiment: wherein the SESS is coupled to a drive shaft of a power-split hybrid electric powertrain; wherein the SESS is configured to store energy to power the powertrain.

17. The apparatus of any preceding embodiment, wherein the flywheel and CVT are coupled a driveshaft that is output from the EM.

18. The apparatus of any preceding embodiment, wherein an input of the EM is coupled to an output shaft of the ICE.

19. The apparatus of any preceding embodiment, wherein an input shaft of the flywheel is coupled to an output shaft of the ICE.

20. The apparatus of any preceding embodiment, wherein the flywheel and CVT are coupled the output EM driveshaft through a gear set.

21. The apparatus of any preceding embodiment, wherein the flywheel and CVT are coupled a driveshaft that is output from the ICE.

22. The apparatus of any preceding embodiment, wherein an input shaft of the flywheel is coupled to an output shaft of the EM.

23. The apparatus of any preceding embodiment, wherein the flywheel is coupled to an output and input of the CVT via a planetary gear.

24. The apparatus of any preceding embodiment, wherein the CVT is disposed between an input and an output of the EM and ICE.

25. The apparatus of any preceding embodiment, wherein the instructions when executed by the processor utilizing dynamic programming and rule-based methods for controlling one or more of load leveling and power surges.

26. The apparatus of any preceding embodiment, wherein the instructions when executed by the processor apply a modified Equivalent Consumption Minimization strategy (ECMs) with factors describing energy dissipation phenomenon in and losses from said SESS.

27. The apparatus of any preceding embodiment, wherein said SESS is used in a series, parallel, or series-parallel configuration with one or more of the ICE or EM.

28. A hybrid vehicle powertrain apparatus with flywheel energy storage system, comprising: a short-term energy storage system (SESS) having a flywheel and continuously variable transmission (CVT); and a control system of a hybrid vehicle, said control system configured for controlling said flywheel and CVT for interoperation with an internal combustion engine (ICE), at least one electric motor (EM) and a battery system; wherein said control system is configured for splitting power among the multiple energy sources of internal combustion engine (ICE), at least one electric motor (EM), and said short-term energy storage system (SESS) to control load leveling and power surges toward optimizing vehicle operating efficiency.

29. The apparatus of any preceding embodiment, wherein said control system is configured for utilizing said flywheel and CVT of said SESS as an energy buffer to level the peak load of the powertrain.

30. The apparatus of any preceding embodiment, wherein said short-term energy storage system (SESS) is used in a series, parallel, or series-parallel hybrid powertrain topology.

31. The apparatus of any preceding embodiment, wherein said SESS is coupled to a main drive shaft of a power-split hybrid electric powertrain to replace an electric motor of the hybrid electric powertrain, so that energy is stored in the SESS and drawn from it to propel the vehicle.

32. The apparatus of any preceding embodiment, wherein said flywheel and CVT is coupled through a gearbox to a driveshaft which is output from an electric motor (EM) and whose input is coupled by a clutch to an output shaft of the internal combustion engine (ICE).

33. The apparatus of any preceding embodiment, wherein said control system is configured for utilizing dynamic programming and rule-based methods for load leveling and power surges.

34. The apparatus of any preceding embodiment, wherein said control system is configured for utilizing a modified Equivalent Consumption Minimization strategy (ECMs) with factors describing energy dissipation phenomenon in and losses from said SESS.

35. A method of operating a hybrid vehicle powertrain having a flywheel energy storage system using any of the previous embodiments.

36. A method of operating hybrid vehicle powertrain comprising: a short-term energy storage system (SESS) comprising a flywheel and continuously variable transmission (CVT), an internal combustion engine (ICE) and an electric motor (EM), the method comprising: receiving data from one or more of the SESS, ICE and EM for controlling said flywheel and CVT for interoperation with the ICE and EM; and splitting power among one or more of the SESS, ICE and EM.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

```
Flywheel_REV_DP_optimization_main
clear all
close all
clc
for i=100:100 % loop for vehcile mass
    summary.em_size_no=0;
    for j=100:100 % loop for eml torque size
        summary.em_size_no=summary.em_size_no+1;
        summary.ice_ size_no=0;
    for k=100:100 % for engine torque size
        summary.ice_size_no=summary.ice_size_no+1;
%%% load components.
% battery
bat.origin='ESS_NIMH45_OVONIC';
% bat.origin='ESS_LI7_temp';
bat_series_No=30;
bat_parallel_No=2;
bat_soc_hi=0.85;
bat_soc_lo=0.25;
bat_soc_ini=0.7;
bat_soc_f_hi=0.71;
bat_soc_f_lo=0.69;
bat_temp=25;
bat_C_max=5;
bat_C_min=-5;
[ bat ] = func_load_bat(
bat.origin,bat_series_No,bat_parallel_No,bat_soc_hi,bat_soc_lo,bat_soc_ini,
bat_soc_f_hi, bat_soc_f_lo,bat_C_max,bat_C_min);
bat. description
clear bat_series_No bat_parallel_No bat_soc_hi bat_soc_lo_bat_soc_ini
bat_soc_f_hi bat_soc_f_lo bat_C_max bat_C_min bat_temp
% drive cycles
cyc.origin='CYC_UDDS';
cyc.Tstep=1;
[cyc]=func_load_cyc(cyc.origin,cyc.Tstep);
cyc. description
% wheelaa
run('WH_bigblue')
% final drive
run('FD_bigblue')
% vehilce
veh.origin='VEH_bigblue';
veh.sizing.mass_scale_factor=i/100;
[veh]=func_load_veh_truck(veh.origin,veh.sizing,wh);
% CVT
r_max=2.55;
r_dot_max=0.6;
[cvt]=func_load_cvt(r_max,r_dot_max);
clear r_max r_dot_max
% flywheel
fw.d=0.5;
fw.thickness=0.025;
[fw]=func_load_fw(fw.d,fw.thickness);
% ICE
ice. origin='FC_CI324';
ice.sizing.spd_scale_factor=1.2;
ice. sizing.trq_scale_factor=0.7*(k/100);
ice=func_load_ice(ice.origin,ice.sizing);
%em1
em1.origin='MC_PM100_UQM';
em1.sizing.spd_ scale_factor=0.8;
em1.sizing.trq_scale_factor=2.5*(j/100);
em1=func_load_em1(em1.origin,em1.sizing);
%em2
em2.origin='MC_PM100_UQM';
em2.sizing.spd_scale_factor=0.8;
em2.sizing.trq_scale_factor=2.5;
em2=func_load_em2(em2.origin,em2.sizing);
%control
CTRL_bigblue
%%% create grid
clear grd
grd.Nx{1}   = 20;
grd.Xn{1}.hi = bat.hi_soc;
```

TABLE 1-continued

```
grd.Xn{1}.lo = bat.lo_soc;
grd.Nx{2}    = 20;
grd.Xn{2}.hi = cvt.r_max;
grd.Xn{2}.lo= cvt.r_min;
grd.Nu{1}    = 21;
grd.Un{1}.hi = 1;
grd.Un{1}.lo = 0;      % Att: Lower bound may vary with engine size.
grd.Nu{2}    = 21;
grd.Un{2}.hi = cvt.max_r_dot;
grd.Un{2}.lo = cvt.min_r_dot;
%% set initial state
grd.X0{1} = bat.ini_soc;
grd.X0{2} = cvt.r_min;
%% final state constraints
grd.XN{1}.hi = bat.f_soc_hi;
grd.XN{1}.lo = bat.f_soc_lo;
grd.XN{2}.hi = 1.1;
grd.XN{2}.lo = 0.9;
%% load driving cycle && define problem
clear prb
prb.Ts = cyc.Ts;
prb.N =cyc.N;
prb.W{1} = cyc.mps;
prb.W{2} = cyc.aps;
%% set input parameters
par.veh=veh;
par. em1=em1;
par.ice=ice;
par.cvt=cvt;
par.Ts=prb.Ts;
par.fd=fd;
par.wh=wh;
par.cyc=cyc;
par.fw=fw;
par.bat=bat;
par.ctrl=ctrl;
% par.description=([])
%% set options
options = dpm();
options.MyInf = 1000;
options.BoundaryMethod ='LevelSet'; % also possible: 'none' or 'LevelSet';
   if strcmp(options.BoundaryMethod,'Line')
      %these options are only needed if 'Line' is used
      options.Iter = 5;
      options.Tol = 1e−8;
      options.FixedGrid = 0;
   end
tic;
[res dyn] = dpm(@Flywheel_REV_V8_DP_optimization,[par],grd,prb,options);
res. simulation_time=toc;
res.fuel_consumption_gallon=sum(res.C{1})/1000/0.7197/3.78541;
res.fuel_econ=par.cyc.distance_mile/res.fuel_consumption_gallon;
res.description=(['Fuel econmany of VEH_mass@',num2str(i),'%, EM1_trq@',
num2str(j),'%, ICE_trq@', num2str(k), 'is ',num2str(res.fuel_econ), 'mpg']);
%% plot components and drive cycle details
% FHEVPlotting_V8;
%
%% plot Results of Dynamic Progamming
% DP_post_process _8;
%% save files
summary.em_size_map(1,summary.em_size_no)=40+10*summary.em_size_no;
summary.ice_size_map(1,summary.ice_size_no)=10+15*summary.ice_size_no;
summary.fuel_econ(summary.em_size_no,summary.ice_size_no)=res.fuel_econ;
summary.Trq_error(summary.em_size_no,summary.ice_size_no)=sum(res.inT)/cyc.N;
filename=(['V8_VEH_mass@',num2str(i),'%, EM1_trq@', num2str(j),'%, ICE_trq@',
num2str(k), '.mat']);
save(filename)
% clearvars -except i j k summary
      end
   end
end
%% fuel econ plot
% surf(summary.ice_size_map,summary.em_size_map,summary.fuel_econ)
% title('fuel economy map')
% xlabel('ICE sizing [%]')
% ylabel('EM1 sizing [%]')
% zlabel('Fuel economy [mpg]')
```

TABLE 2

Flywheel_REV_DP_optimization
```
function [X C I out] = Flywheel_HEV_V8_DP_optimization(inp,par)
%function [X C I out] = hev(inp,par)
%HEV Computes the resulting state-of-charge based on current state-
%   of-charge, inputs and drive cycle demand.
%
%   [X C I out] = HEV(INP,PAR)
%
%   INP = input structure
%   INP.X{1} = current state-of-charge
%   INP.X{2} = current CVT gear ratio
%   INP.U{1} = engine throttle
%   INP.U{2} = r_cvt_dot
%   PAR = user defined parameters
%   X{1}    = resulting state-of-charge
%   X{2}    = resulting CVT gear ratio
%   C       = cost matrix
%   I       = infeasible matrix
%   out     = user defined output signals
%%%%%%%%%%%%%%%%%%%%%%%%%%%%%%%%%%%%%%%%%%%%
%
%%component data loading %%%%%%%%%%%%%%%%%%%
%%%%%%%%%%%%%%%%%%%%%%%%%%%%%%%%%%%%%%%%%%%%
%
%% VEHICLE
% use par.veh directly
%% final drive
% use par.fd directly
%% wheel
% Wheel speed (rad/s)
wv = inp.W{1} ./ par.wh.radius;
% Wheel acceleration (rad/s.^2)
dwv = inp.W{2} ./ par.wh.radius;
% Wheel torque (Nm)
Tv = ((wv>0).*par.veh.gravity*par.veh.mass.* par.wh.rrc + ... rolling resistance
    (wv>0).*0.5.*par.veh.air_density.*par.veh.CD.*par.veh.FA.*inp.W{1}.^2 ...
areodyamic drag
    + par.veh.mass.*inp.W{2}) .* par.wh.radius; % vehicle acceleration
%% gear box/CVT
r_cvt=inp.X{2};
r_3=1;
eff_3=1;
% Crankshaft speed
ws=wv.*par.fd.ratio;
% Crankshaft acceleration (rad/s.^2)
dws=dwv .* par.fd.ratio;
    % road load reflected on (Nm)
Tg=(Tv>0) .* Tv ./ par.fd.ratio./ par.fd.eff ...
    +(Tv+21=0) .* Tv ./ par.fd.ratio.* par.fd.eff;
%% flywheel parameters
% flywheel drag coeffcient c1=2.8e-5 c2=0.049
% flywheel speed (rad/s)
wfw=ws.*r_3.*r_cvt;
dwfw=dws.*r_3.*r_cvt;
infw=(wfw>1000);
%% Total required torque at shaft
mc_inertia=0.03;
% Flywheel drag torqe
Tfw0 = (ws>0).*par.fw.c2+ par.fw.c1.*wfw./^1.8;
% Engine drag torque (Nm)
Te0 = dws .* par.ice. inertia + interp 1(par.ice.map_spd,par.ice.Te0_list,ws,'linear','extrap');
% Electric motor drag torque (Nm)
Tm0 = dws .* mc_inertia;
% Total required torque (Nm)
Ttot = Te0.*(inp.U{1}~=0) + Tm0 + Tg;
%% engine efficiency and torque
Te_max = interp1(par.ice.map_spd,par.ice.max_trq,ws,'linear.*','extrap');
% Torque provided by engine
Te = (ws>min(par.ice.map_spd)) .* (ws<max(par.ice.map spd)) .* inp.U{1}.*Te_max;
e_th=
interp2(par.ice.map spd,par.ice.map_trq,par.ice.fuel_eff,ws.*ones(size(Te)),Te,'spline',
0.01) ;
m_dot_fuel = Te.*ws./e_th./par.ice.lhv; % g/s
Pe = m_dot_fuel .* par.ice.lhv;
ine =(Te <0)+(Te >
Te_max)+(ws<min(par.ice.map_spd)).*(Te>0)+(ws>max(par.ice.map_spd)).*(Te>0)+
(e_t h<0)+(e_th>max(max(parice.fuel_eff)));
%% flywheel troque
% Torque proveded by the flywheel at the driveshaft end
% limit the r_dot according to the current state of cvt
```

TABLE 2-continued

```
r_dot_max=(par.cvt.r_max-inp.X{2})/par.Ts;
r_dot_min=(par.cvt.r_min-inp.X{2})/par.Ts;
r_dot_temp = min(inp.U{2},r_dot_max);
r_dot= max(r_dot_min,r_dot_temp);
Tfw = (-par.fw.J.*(r_dot.*r_3.*ws+r_cvt.*r_3.*dws)-Tfw0).*r_cvt.*r_3. . .
   .*(eff_3.*par.cvt.eff)./\(sign(-par.fw.J.*(r_dot.*r_3.*ws+inp.X{2}.*r_3.*dws)-Tfw0));
Tfw=real(Tfw);
%% motor efficiency and torque
Tmmax= interp1(par.em1.map_spd,par.em1.max_trq,ws,'linear.*','extrap');
Tmmin= interp1(par.em1.map_spd,par.em1.max_gen_trq,ws,'linear.*','extrap');
% Torque provided by electric motor
Tm_temp=Ttot-Te-Tfw;
Tm_temp=max(Tm_temp,Tmmin);
Tm = min(Tm_temp,Tmmax);
% Electric motor efficiency
e = (ws~=0) .*
interp2(par.em1.map_trq,par.em1.map_spd,par.em1.eff_map,Tm,ws.*ones(size(Tm)),
'spline',0.1)+(ws==0) ;
inm = (ws>max(par.em1.map_spd)) +(ws<min(par.em1.map_spd))+ (Tm<0) .* (Tm <
Tmmin) + . . .
       (Tm>=0) .* (Tm > Tmmax);
% Calculate electric power consumption
Pm = (Tm<0) .* ws.*Tm.*e + (Tm>=0) .* ws.*Tm./e;
% BATTERY
% Battery efficiency
% columbic efficiency (0.9 when charging)
e_cou =(Pm>0).*par.bat.coulumbic_eff(1) + (Pm<=0) .* par.bat.coulumbic_eff(2);
% Battery internal resistance
r=(Pm>0) .* interp1(par.bat. soc, par.bat.r_dis, inp.X{1},'linear.*','extrap') . . .
   + (Pm<=0) .* interp1(par.bat.soc, par.bat.r_chg, inp.X{1},'linear.*','extrap');
% Battery voltage
v = interp1(par.bat. soc, par.bat.voc, inp.X{1},'linear.*','extrap');
% Battery current limitations
im =(Pm>0) .* interp1(par.bat. soc, par.bat.I_max, inp.X{1},'linear.*','extrap') . . .-
   (Pm<=0) .* interp1(par.bat.soc, par.bat.I_min, inp.X{1},'linear.*','extrap');
% Battery current
Ib = e_cou .* (v-sqrt(v./\2 - 4.*r.*Pm))./(2.*r);
% New battery state of charge
X{1}= - Ib / (par.bat.ah cap.* 3600).*par.cyc.Ts + inp.X{1};
% Battery power consumption
Pb = Ib .* v;
% Update infeasible
inb =(v./\2 < 4.*r.*Pm) + (abs(Ib)>im);
% Set new state of charge to real values
X{1} = (conj(X{1})+X{1})/2;
Pb = (conj(Pb)+Pb)/2;
Ib = (conj(Ib)+Ib)/2;
X{2} = inp.X{2}+r_dot*par.cyc.Ts;
% COST
% Summarize infeasible matrix
I =0;% (infw+inps+inb+ine+inm~=0);
% Calculate cost matrix (fuel mass flow)
C{1} = m_dot_fuel;
% SIGNALS
%    store relevant signals in out
out.Te = Te;
out.Tema = Te_max;
out.Tm =Tm;
out.Tmmax=Tmmax;
out.Tmmin=Tmmin;
out.ws = ws;
out.Ttot=Ttot;
out. SOC=X{1};
out.Ib = Ib;
out.Pb = Pb;
out.Pm = Pm;
out.Tfw=Tfw;
out.r_dot=r_dot;
out.r=r_cvt;
out.infw=infw;
out.ine=ine;
out.inm=inm;
out.inb=inb;
out.m_dot_fuel =m_dot_fuel;
out.inT=abs((Te+Tm+Tfw)-Ttot);
out.fw_Pl=Tfw0.*wfw;
out.bat_Pl=Ib./\2.*r;
out.em1_Pl=abs(abs(ws.*Tm)-abs(Pm));
```

TABLE 3

Characteristics of Different Battery Technologies

| Battery | Anode | Cathode | Electrolyte | Cell voltage | Wh/kg | W/kg | Cycles |
|---|---|---|---|---|---|---|---|
| Lead-acid | Pb | $PbO_2$ | $H_2SO_4$ | 2 V | 40 | 180 | 600 |
| Nickel-cadmium | Cd | $Ni(OH)_2$ | KOH | 1.2 V | 50 | 120 | 1500 |
| Nickel-metal hydride | Metal hydride | $Ni(OH)_2$ | $KOH^a$ | 1.2 V | 70 | 200 | 1000 |
| Lithium-ion | carbon | Lithium oxide | Lithiated solution | 3.6 V | 130 | 430 | 1200 |

TABLE 4

Operation Modes of TESH Powertrain

| Operation mode | ICE | EM | SESS | Name |
|---|---|---|---|---|
| 1 | 0 | −1 | −1 | Full Regenerative Braking |
| 2 | | | 0 | EM Regenerative Braking |
| 3 | | | 1 | EM Regenerative Braking SESS Propulsion |
| 4 | | 0 | −1 | SESS Regenerative Braking |
| 5 | | | 0 | Stop mode |
| 6 | | | 1 | SESS propulsion |
| 7 | | 1 | −1 | EM Propulsion SESS Regenerative Braking |
| 8 | | | 0 | EM Propulsion |
| 9 | | | 1 | EM SESS Propulsion |
| 10 | 1 | −1 | −1 | ICE Propulsion EM & SESS Regenerative Braking |
| 11 | | | 0 | ICE Propulsion EM Regenerative Braking |
| 12 | | | 1 | ICE& SESS Propulsion EM Regenerative Braking |
| 13 | | 0 | −1 | ICE Propulsion SESS Regenerative Braking |
| 14 | | | 0 | ICE Propulsion |
| 15 | | | 1 | ICE & SESS Propulsion |
| 16 | | 1 | −1 | ICE & EM Propulsion SESS Regenerative Braking |
| 17 | | | 0 | ICE& EM Propulsion |
| 18 | | | 1 | Full Propulsion |

TABLE 5

Operation Modes in High-Level Modes of the TESH Powertrain

| | Operation modes |
|---|---|
| Low-speed Propulsion Mode | 3, 6, 7, 8, 9 |
| High-speed Propulsion Mode | 3, 6, 7, 8, 9, 10, 11, 12, 13, 14, 15, 16, 17, 18 |
| Regenerative Braking Mode | 1, 2, 3, 4, 7 |

TABLE 6

Threshold Values

| Threshold Value | Set 1 | Set 2 |
|---|---|---|
| Opt1 | $T_{e, opt}$ | $T_{e, opt}$ |
| Max1 | $T_{e, max}$ | $T_{e, max}$ |
| Max2 | $T_{m, max}$ | $T_{m, opt}$ |
| Max3 | $T_{sess, max}$ | $T_{sess, opt}$ |

What is claimed is:

1. A hybrid vehicle powertrain apparatus, comprising:
a short-term energy storage system (SESS) comprising a flywheel and continuously variable transmission (CVT);
an internal combustion engine (ICE) coupled to the SESS;
an electric motor (EM) coupled to the SESS; and
a controller coupled to the SESS, ICE and EM;
wherein the controller is configured for controlling said flywheel and CVT for interoperation with the ICE and EM; and
wherein said controller is further configured for splitting power among one or more of the SESS, ICE and EM; and
wherein the controller is further configured to control one or more of load leveling and power surges of one or more of the SESS, ICE and EM to optimize vehicle operating efficiency.

2. The apparatus of claim 1, wherein the controller is further configured to control one or more of said flywheel and CVT of said SESS to provide an energy buffer to level a peak load of a hybrid electric powertrain comprising the SESS, ICE and EM.

3. The apparatus of claim 1, wherein the flywheel is coupled to an output and input of the CVT via a planetary gear.

4. The apparatus of claim 3, wherein the CVT is disposed between an input and an output of the EM and ICE.

5. A hybrid vehicle powertrain apparatus, comprising:
a short-term energy storage system (SESS) comprising a flywheel and continuously variable transmission (CVT);
an internal combustion engine (ICE) coupled to the SESS;
an electric motor (EM) coupled to the SESS; and
a controller coupled to the SESS, ICE and EM;
wherein the controller is configured for controlling said flywheel and CVT for interoperation with the ICE and EM; and
wherein said controller is further configured for splitting power among one or more of the SESS, ICE and EM; and
wherein the controller is further configured to control one or more of said flywheel and CVT of said SESS to provide an energy buffer to level a peak load of a hybrid electric powertrain comprising the SESS, ICE and EM.

6. The apparatus of claim 5, wherein the controller is further configured to control one or more of load leveling and power surges of one or more of the SESS, ICE and EM to optimize vehicle operating efficiency.

7. The apparatus of claim 5, wherein the flywheel is coupled to an output and input of the CVT via a planetary gear.

8. The apparatus of claim 7, wherein the CVT is disposed between an input and an output of the EM and ICE.

9. A hybrid vehicle powertrain apparatus, comprising:
a short-term energy storage system (SESS) comprising a flywheel and continuously variable transmission (CVT);
an internal combustion engine (ICE) coupled to the SESS;
an electric motor (EM) coupled to the SESS; and a controller coupled to the SESS, ICE and EM;
wherein the controller is configured for controlling said flywheel and CVT for interoperation with the ICE and EM; and
wherein said controller is further configured for splitting power among one or more of the SESS, ICE and EM; and
wherein the flywheel is coupled to an output and input of the CVT via a planetary gear.

10. The apparatus of claim 9, wherein the controller is further configured to control one or more of load leveling and power surges of one or more of the SESS, ICE and EM to optimize vehicle operating efficiency.

11. The apparatus of claim 9, wherein the controller is further configured to control one or more of said flywheel and CVT of said SESS to provide an energy buffer to level a peak load of a hybrid electric powertrain comprising the SESS, ICE and EM.

12. The apparatus of claim 9, wherein the CVT is disposed between an input and an output of the EM and ICE.

13. A hybrid vehicle powertrain apparatus, comprising:
(a) a short-term energy storage system (SESS) comprising a flywheel and continuously variable transmission (CVT);
(b) an internal combustion engine (ICE) coupled to the SESS;
(c) an electric motor (EM) coupled to the SESS; and
(d) a processor coupled to the SESS, ICE and EM; and
(e) a non-transitory memory storing instructions executable by the processor;
(f) wherein said instructions, when executed by the processor, perform steps comprising:
(i) receiving data from one or more of the SESS, ICE and EM for controlling said flywheel and CVT for interoperation with the ICE and EM; and
(ii) splitting power among one or more of the SESS, ICE and EM; and
(iii) controlling one or more of load leveling and power surges of one or more of the SESS, ICE and EM to optimize vehicle operating efficiency.

14. The apparatus of claim 13, wherein the instructions when executed by the processor further perform the steps comprising:
controlling one or more of said flywheel and CVT of said SESS to provide an energy buffer to level a peak load of a hybrid electric powertrain comprising the SESS, ICE and EM.

15. The apparatus of claim 13, wherein the flywheel is coupled to an output and input of the CVT via a planetary gear.

16. The apparatus of claim 15, wherein the CVT is disposed between an input and an output of the EM and ICE.

17. The apparatus of claim 13, wherein the instructions when executed by the processor utilizing dynamic programming and rule-based methods for controlling one or more of load leveling and power surges.

18. The apparatus of claim 13, wherein the instructions when executed by the processor apply a modified Equivalent Consumption Minimization strategy (ECMs) with factors describing energy dissipation phenomenon in and losses from said SESS.

19. The apparatus of claim 13, wherein said SESS is used in a series, parallel, or series-parallel configuration with one or more of the ICE or EM.

20. A hybrid vehicle powertrain apparatus, comprising:
(a) a short-term energy storage system (SESS) comprising a flywheel and continuously variable transmission (CVT);
(b) an internal combustion engine (ICE) coupled to the SESS;
(c) an electric motor (EM) coupled to the SESS; and
(d) a processor coupled to the SESS, ICE and EM; and
(e) a non-transitory memory storing instructions executable by the processor;
(f) wherein said instructions, when executed by the processor, perform steps comprising:
(i) receiving data from one or more of the SESS, ICE and EM for controlling said flywheel and CVT for interoperation with the ICE and EM; and
(ii) splitting power among one or more of the SESS, ICE and EM; and
(iii) controlling one or more of said flywheel and CVT of said SESS to provide an energy buffer to level a peak load of a hybrid electric powertrain comprising the SESS, ICE and EM.

21. The apparatus of claim 20, wherein the instructions when executed by the processor further perform the steps comprising:
controlling one or more of load leveling and power surges of one or more of the SESS, ICE and EM to optimize vehicle operating efficiency.

22. The apparatus of claim 21, wherein the instructions when executed by the processor utilizing dynamic programming and rule-based methods for controlling one or more of load leveling and power surges.

23. The apparatus of claim 20, wherein the flywheel is coupled to an output and input of the CVT via a planetary gear.

24. The apparatus of claim 23, wherein the CVT is disposed between an input and an output of the EM and ICE.

25. The apparatus of claim 20, wherein the instructions when executed by the processor apply a modified Equivalent Consumption Minimization strategy (ECMs) with factors describing energy dissipation phenomenon in and losses from said SESS.

26. The apparatus of claim 20, wherein said SESS is used in a series, parallel, or series-parallel configuration with one or more of the ICE or EM.

27. A hybrid vehicle powertrain apparatus, comprising:
(a) a short-term energy storage system (SESS) comprising a flywheel and continuously variable transmission (CVT);
(b) an internal combustion engine (ICE) coupled to the SESS;
(c) an electric motor (EM) coupled to the SESS; and
(d) a processor coupled to the SESS, ICE and EM; and
(e) a non-transitory memory storing instructions executable by the processor;
(f) wherein said instructions, when executed by the processor, perform steps comprising:
(i) receiving data from one or more of the SESS, ICE and EM for controlling said flywheel and CVT for interoperation with the ICE and EM; and
(ii) splitting power among one or more of the SESS, ICE and EM; and
(g) wherein the flywheel is coupled to an output and input of the CVT via a planetary gear.

28. The apparatus of claim 27, wherein the instructions when executed by the processor further perform the steps comprising:

controlling one or more of load leveling and power surges of one or more of the SESS, ICE and EM to optimize vehicle operating efficiency.

29. The apparatus of claim 28, wherein the instructions when executed by the processor utilizing dynamic programming and rule-based methods for controlling one or more of load leveling and power surges.

30. The apparatus of claim 27, wherein the instructions when executed by the processor further perform the steps comprising:
controlling one or more of said flywheel and CVT of said SESS to provide an energy buffer to level a peak load of a hybrid electric powertrain comprising the SESS, ICE and EM.

31. The apparatus of claim 27, wherein the CVT is disposed between an input and an output of the EM and ICE.

32. The apparatus of claim 27, wherein the instructions when executed by the processor apply a modified Equivalent Consumption Minimization strategy (ECMs) with factors describing energy dissipation phenomenon in and losses from said SESS.

33. The apparatus of claim 27, wherein said SESS is used in a series, parallel, or series-parallel configuration with one or more of the ICE or EM.

34. A hybrid vehicle powertrain apparatus, comprising:
(a) a short-term energy storage system (SESS) comprising a flywheel and continuously variable transmission (CVT);
(b) an internal combustion engine (ICE) coupled to the SESS;
(c) an electric motor (EM) coupled to the SESS; and
(d) a processor coupled to the SESS, ICE and EM; and
(e) a non-transitory memory storing instructions executable by the processor;
(f) wherein said instructions, when executed by the processor, perform steps comprising:
(i) receiving data from one or more of the SESS, ICE and EM for controlling said flywheel and CVT for interoperation with the ICE and EM; and
(ii) splitting power among one or more of the SESS, ICE and EM; and
(iii) applying a modified Equivalent Consumption Minimization strategy (ECMs) with factors describing energy dissipation phenomenon in and losses from said SESS.

35. The apparatus of claim 34, wherein the instructions when executed by the processor further perform the steps comprising:
controlling one or more of load leveling and power surges of one or more of the SESS, ICE and EM to optimize vehicle operating efficiency.

36. The apparatus of claim 35, wherein the instructions when executed by the processor utilizing dynamic programming and rule-based methods for controlling one or more of load leveling and power surges.

37. The apparatus of claim 34, wherein the instructions when executed by the processor further perform the steps comprising:
controlling one or more of said flywheel and CVT of said SESS to provide an energy buffer to level a peak load of a hybrid electric powertrain comprising the SESS, ICE and EM.

38. The apparatus of claim 34, wherein the flywheel is coupled to an output and input of the CVT via a planetary gear.

39. The apparatus of claim 38, wherein the CVT is disposed between an input and an output of the EM and ICE.

40. The apparatus of claim 34, wherein said SESS is used in a series, parallel, or series-parallel configuration with one or more of the ICE or EM.

41. The apparatus of claim 5, 2 or 11:
wherein the SESS is coupled to a drive shaft of a power-split hybrid electric powertrain; and
wherein the SESS is configured to store energy to power the powertrain.

42. The apparatus of claim 1, 5 or 9, wherein the flywheel and CVT are coupled a driveshaft that is output from the EM.

43. The apparatus of claim 42, wherein an input of the EM is coupled to an output shaft of the ICE.

44. The apparatus of claim 42, wherein an input shaft of the flywheel is coupled to an output shaft of the ICE.

45. The apparatus of claim 42, wherein the flywheel and CVT are coupled to the output EM driveshaft through a gear set.

46. The apparatus of claim 1, 5 or 9, wherein the flywheel and CVT are coupled to a driveshaft that is output from the ICE.

47. The apparatus of claim 46, wherein an input shaft of the flywheel is coupled to an output shaft of the EM.

48. The apparatus of claim 20, 14, 30, or 37:
wherein the SESS is coupled to a drive shaft of a power-split hybrid electric powertrain;
wherein the SESS is configured to store energy to power the powertrain.

49. The apparatus of claim 13, 20, 27 or 34, wherein the flywheel and CVT are coupled to a driveshaft that is output from the EM.

50. The apparatus of claim 49, wherein an input of the EM is coupled to an output shaft of the ICE.

51. The apparatus of claim 49, wherein an input shaft of the flywheel is coupled to an output shaft of the ICE.

52. The apparatus of claim 49, wherein the flywheel and CVT are coupled to the output EM driveshaft through a gear set.

53. The apparatus of claim 13, 20, 27 or 34, wherein the flywheel and CVT are coupled to a driveshaft that is output from the ICE.

54. The apparatus of claim 53, wherein an input shaft of the flywheel is coupled to an output shaft of the EM.

* * * * *